(12) United States Patent
Laksono et al.

(10) Patent No.: US 6,633,296 B1
(45) Date of Patent: Oct. 14, 2003

(54) APPARATUS FOR PROVIDING DATA TO A PLURALITY OF GRAPHICS PROCESSORS AND METHOD THEREOF

(75) Inventors: Indra Laksono, Richmond Hill (CA); Milivoje Aleksic, Richmond Hill (CA); Antonio Asaro, Scarborough (CA); Andrew E. Gruber, Arlington, MA (US); Gordon Caruk, Bramalea (CA); Brian Lee, Etobicoke (CA)

(73) Assignee: ATI International SRL, Barbados (KY)

( * ) Notice: Subject to any disclaimer, the term of this patent is extended or adjusted under 35 U.S.C. 154(b) by 0 days.

(21) Appl. No.: 09/579,432

(22) Filed: May 26, 2000

(51) Int. Cl.$^7$ .................................................. G06F 15/16
(52) U.S. Cl. ....................... 345/502; 345/531; 345/519; 345/520; 710/305
(58) Field of Search ................................. 345/552, 520, 345/531, 536, 519, 532, 422, 582, 554, 502, 505, 557; 711/100, 104, 105, 154; 710/305–307, 309, 310, 312–315, 107, 110

(56) References Cited

U.S. PATENT DOCUMENTS

| | | | |
|---|---|---|---|
| 5,678,009 A | * | 10/1997 | Bains et al. ................. 710/125 |
| 5,892,964 A | * | 4/1999 | Horan et al. .................. 712/33 |
| 6,157,398 A | * | 12/2000 | Jeddeloh ...................... 345/532 |
| 6,167,476 A | * | 12/2000 | Olarig et al. ................ 710/315 |
| 6,433,785 B1 | * | 8/2002 | Garcia et al. ................ 345/531 |

OTHER PUBLICATIONS

"PCI–to–AGP move boosts 3–D graphics" by Robert Brummer, Electronic Engineering Times, CMP Publications, Inc. May 5, 1997.*

* cited by examiner

*Primary Examiner*—Kee M. Tung
(74) *Attorney, Agent, or Firm*—Vedder, Price, Kaufman & Kammholz, P.C.

(57) ABSTRACT

In a specific embodiment, a system for providing video is disclosed, the system having a system bus, which in one embodiment is an Advanced Graphics Port (AGP) bus. The system bus is connected to a data bridge, which is connected to a second and third AGP bus. Each of the AGP busses are connected to graphics processors. The bridge routes data requests from one graphics processor to the second graphics processor without accessing the system AGP bus based upon a memory mapping information stored in a routing table or a register set. In another aspect of the present invention, the bridge responds to initialization requests using attributes that may vary depending on the specific mode of operation. Another aspect of the present invention allows for conversion between various AGP protocol portions.

18 Claims, 36 Drawing Sheets

| DATA TYPE | CH1 REMAP REGISTERS | | |
|---|---|---|---|
| | HOST OFFSET | OFFSET RANGE | CH OFFSET |
| Z | 1G | 2M | 11M |
| FB | 1G+4M | 3M | 13M |
| BB | 1G+10M | 1M | 16M |
| TEXTURE | 1G+12M | 3M | 0 |

910

920

| DATA TYPE | CH2 REMAP REGISTERS | | |
|---|---|---|---|
| | HOST OFFSET | HOST SIZE | CH 2 OFFSET |
| Z | 1G +2M | 2M | 1M |
| FB | 1G+7M | 3M | 3M |
| BB | 1G+11M | 1M | 6M |
| TEXTURE | 1G+12M | 3M | 29M |

FIGURE 9

| DATA TYPE | REMAP REGISTERS | | | | SPLIT |
|---|---|---|---|---|---|
| | HOST OFFSET | OFFSET RANGE | CH 1 OFFSET | CH 2 OFFSET | |
| Z | 1G | 4M | 11M | 1M | 1 |
| FB | 1G+4M | 6M | 13M | 3M | 1 |
| BB | 1G+10M | 2M | 16M | 6M | 1 |
| TEXTURE | 1G+12M | 3M | 0 | 29M | 0 |

| Row | DEV 1 TYPE | DEV 2 TYPE |
|---|---|---|
| 1 | AGP R | PCI R |
| 2 | AGP W | PCI W/ AGP FW |
| 3 | AGP FW | PCI W |
| 4 | PCI R | PCI R |
| 5 | PCI W | PCI W |

TRANSLATION TABLE 3240

FIGURE 33

APPARATUS FOR PROVIDING DATA TO A PLURALITY OF GRAPHICS PROCESSORS AND METHOD THEREOF

COPENDING APPLICATIONS

A application exists having Ser. No. 09/520,429, entitled "SYSTEM FOR MULTIPLE RENDERING OF GRAPHICS DATA AND METHOD THEREOF", having at least one inventor in common, and a filing date of Mar. 8, 2000.

A application exists having Ser. No. 09/579,007, entitled "SYSTEM FOR MULTIPLE RENDERING OF GRAPHICS DATA AND METHOD THEREOF", having at least one inventor in common, and a filing date concurrent with the present application.

A application exists having Ser. No. 09/579,224, entitled "METHOD AND APPARATUS FOR ROUTING DATA TO MULTIPLE GRAPHICS DEVICES", having at least one inventor in common, and a filing date concurrent with the present application.

A application exists having Ser. No. 09/579,006, entitled "METHOD OF CONFIGURING, CONTROLLING, AND ACCESSING A BRIDGE AND APPARATUS THEREFOR", having at least one inventor in common, and a filing date concurrent with the present application.

A application exists having Ser. No. 09/579,203, entitled "APPARATUS AND METHOD FOR TRANSMITTING DATA", having at least one inventor in common, and a filing date concurrent with the present application.

A application exists having Ser. No. 09/579,202, entitled "MULTIPLE DEVICE BRIDGE APPARATUS AND METHOD THEREOF", having at least one inventor in common, and a filing date concurrent with the present application.

FIELD OF THE INVENTION

The present invention relates to multi-graphics processor systems, and more particularly to accessing a common memory from multiple graphics processors.

BACKGROUND OF THE INVENTION

Graphics processors are used to render images based upon data and/or commands issued by a system processor. Multiple graphics processors have been used in order to improve the rate at which graphics data has been rendered. By dividing the rendering workload among multiple independent graphics processors, the workload of rendering graphics is multiplexed, resulting in a system capable of rendering images at a greater rate. However, because of the independent nature of multiple graphics processors used in the prior art, certain efficiencies based upon reuse of rendered data are lost. In some instances, a specific use of multiple graphics processors partitions the rendering tasks of one or several frames into separate portions to be distributed among separate processors. However, a problem occurs when the system bus, system software, or rendering software is not capable of supporting multiple graphics devices. Another problem occurs when devices being connected through a bridge support different aspects of various protocols.

Therefore, a system and/or method capable of multiplexing the rendering of images, while maintaining efficiencies associated with the reuse of rendered data would be advantageous.

BRIEF DESCRIPTION OF THE DRAWINGS

FIG. 9 illustrates, in tabular form, values associated with a plurality of register sets;

FIG. 33 illustrates, in tabular form, a representation of the translation table illustrated of FIG. 32;

DETAILED DESCRIPTION OF THE DRAWINGS

In a specific embodiment of the present invention, a system for providing video is disclosed. The system has a system bus, which in one embodiment is an Advanced Graphics Port (AGP) bus. The system bus is connected to a data bridge, which routes data to a second and third AGP bus. The second and third AGP busses are connected to graphics processors. The bridge routes data requests from one graphics processor to the second graphics processor without accessing the system AGP bus.

In accordance with a specific embodiment the present invention, data associated with a specific object and an object transformation matrix are received at a bridge. Based upon the transformation matrix, a transform engine associated with the bridge calculates the view (screen) position of the specific object. Based on the view position calculation, the data is transmitted to the appropriate graphics device. The data associated with a specific object is transmitted to a first graphics device when the view position is associated with a first portion of viewable area. The data associated with the specific object is transmitted to a second graphics device when the object position is associated with a second portion of viewable area. If the specific object has a third position that is not in any viewable area, no data is transmitted to graphics processor. The present invention is better understood with reference to the specific embodiments of FIGS. 14 through 17.

In accordance with a specific embodiment the present invention, a bridge device receives a first request for a specific attribute of the bridge device during a configuration routine. When in a first mode of operation the bridge device returns the requested attribute of the bridge device (itself). When in a second mode of operation the bridge device returns the requested attribute for a different device. In effect, the requesting device believes the responding device is a device other than what it really is. This is useful, for example, where multiple graphics processors are connected to a bridge to render a single image, and it is desired for the requested device to treat the multiple graphics processors as a single processor. Specific aspects of the present invention are described with reference to FIGS. 18–25.

In accordance with a specific embodiment the present invention, a bridge can translate an AGP access from one type of AGP access to another type of AGP access. This allows for efficient transfer of data between devices that support different portions of the AGP specification. A specific implementation of this aspect of the present invention is illustrated in FIGS. 26–33.

Figure 34:
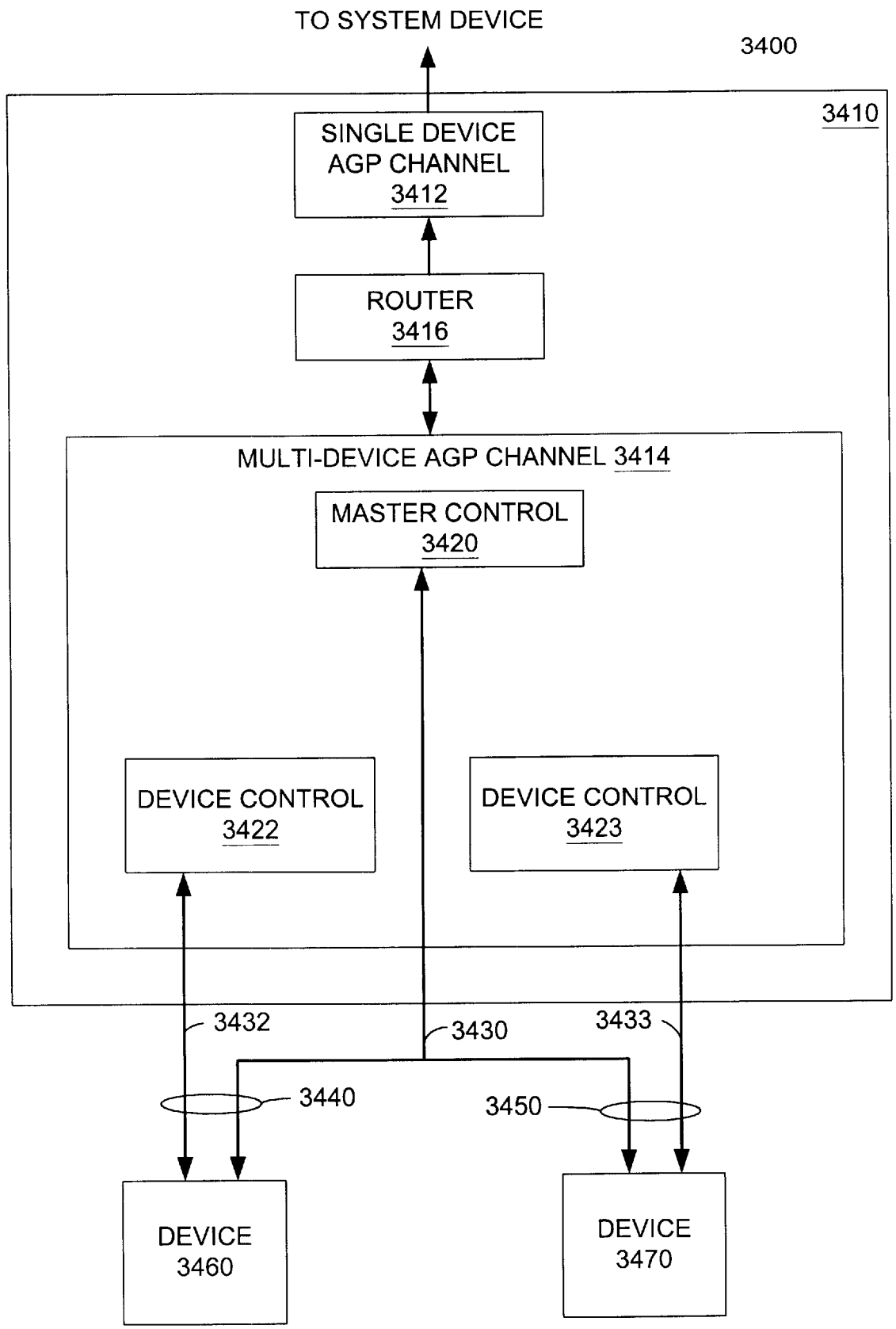
FIG. 34 illustrates, in block diagram form, a bridge supporting a multi-device AGP channel.

In accordance with a specific embodiment the present invention, an AGP-type bus is described that supports multiple AGP masters. A specific implementation of this aspect of the present invention is illustrated in FIG. 34.

Figure 35:
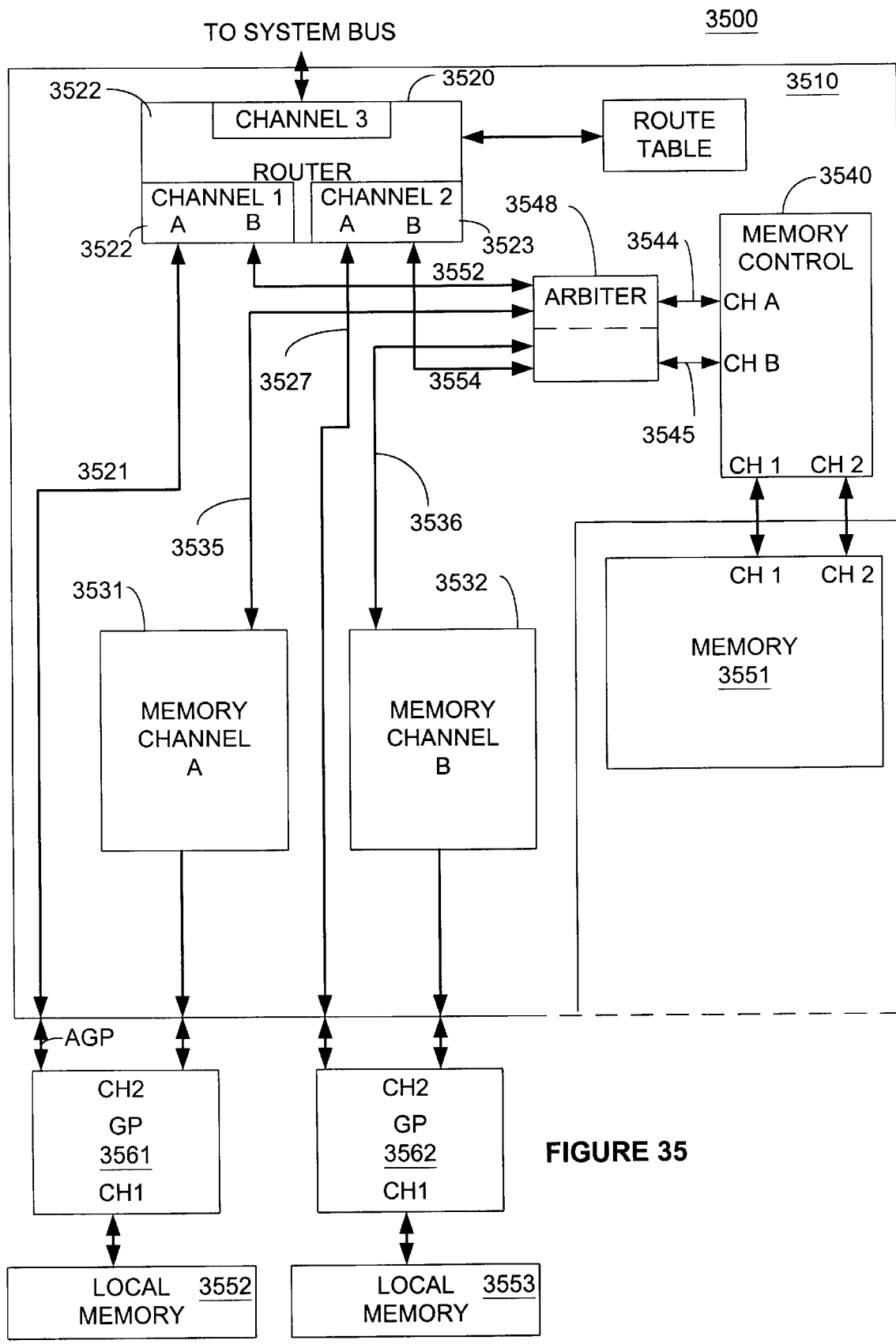
FIGS. 35 and 36 illustrate, in block diagram form, a bridge supporting a common memory.
Figure 36:
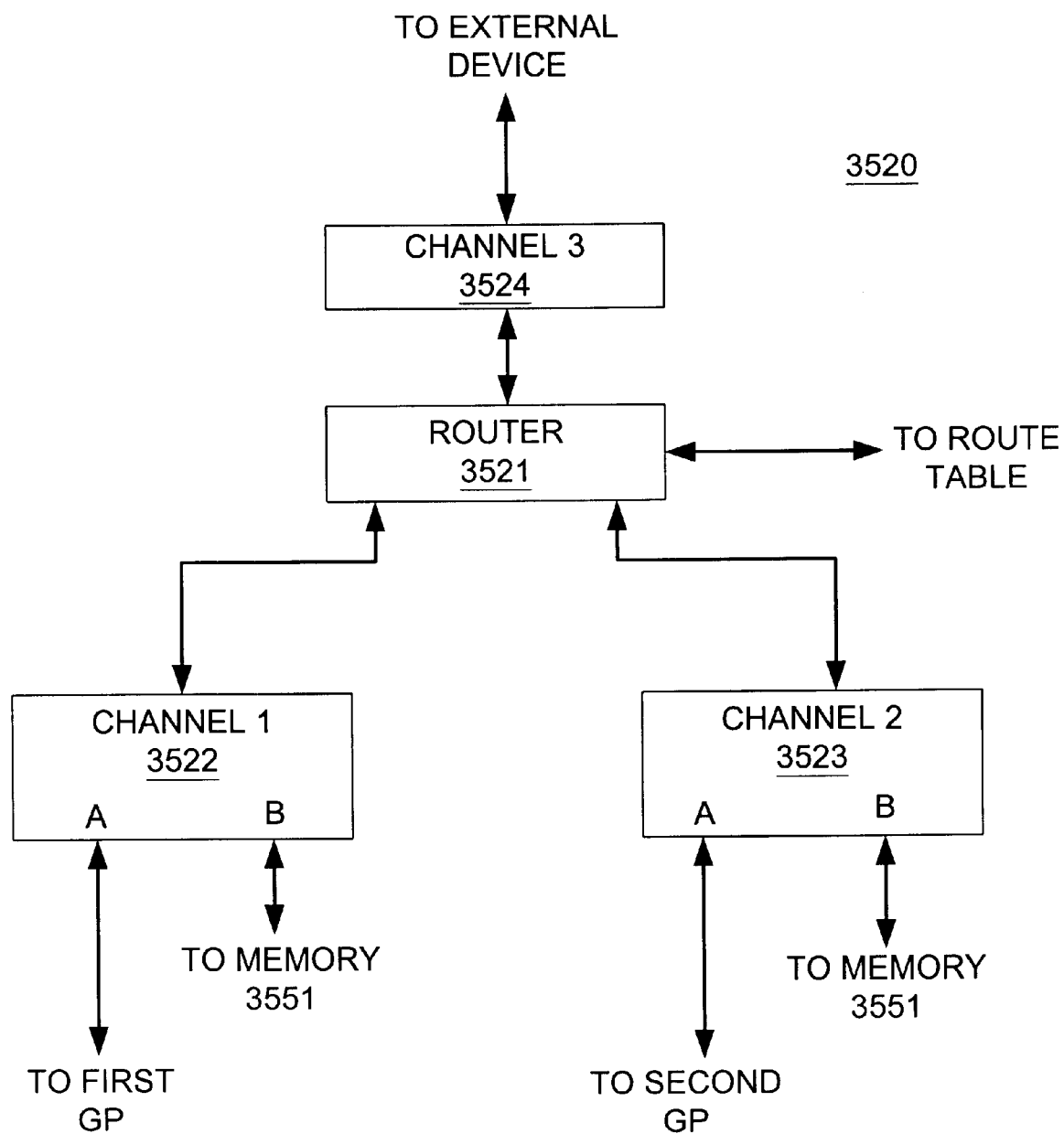

In accordance with a specific embodiment of the present invention, a portion of video memory is available for access by each of a plurality of graphics processors through a bridge. By allowing a portion of video memory to be commonly accessed through the bridge, all processors have access to a current copy of the data without the use of additional accesses. FIGS. 35 and 36 illustrate a specific embodiment of providing common access to data.

Figure 1:
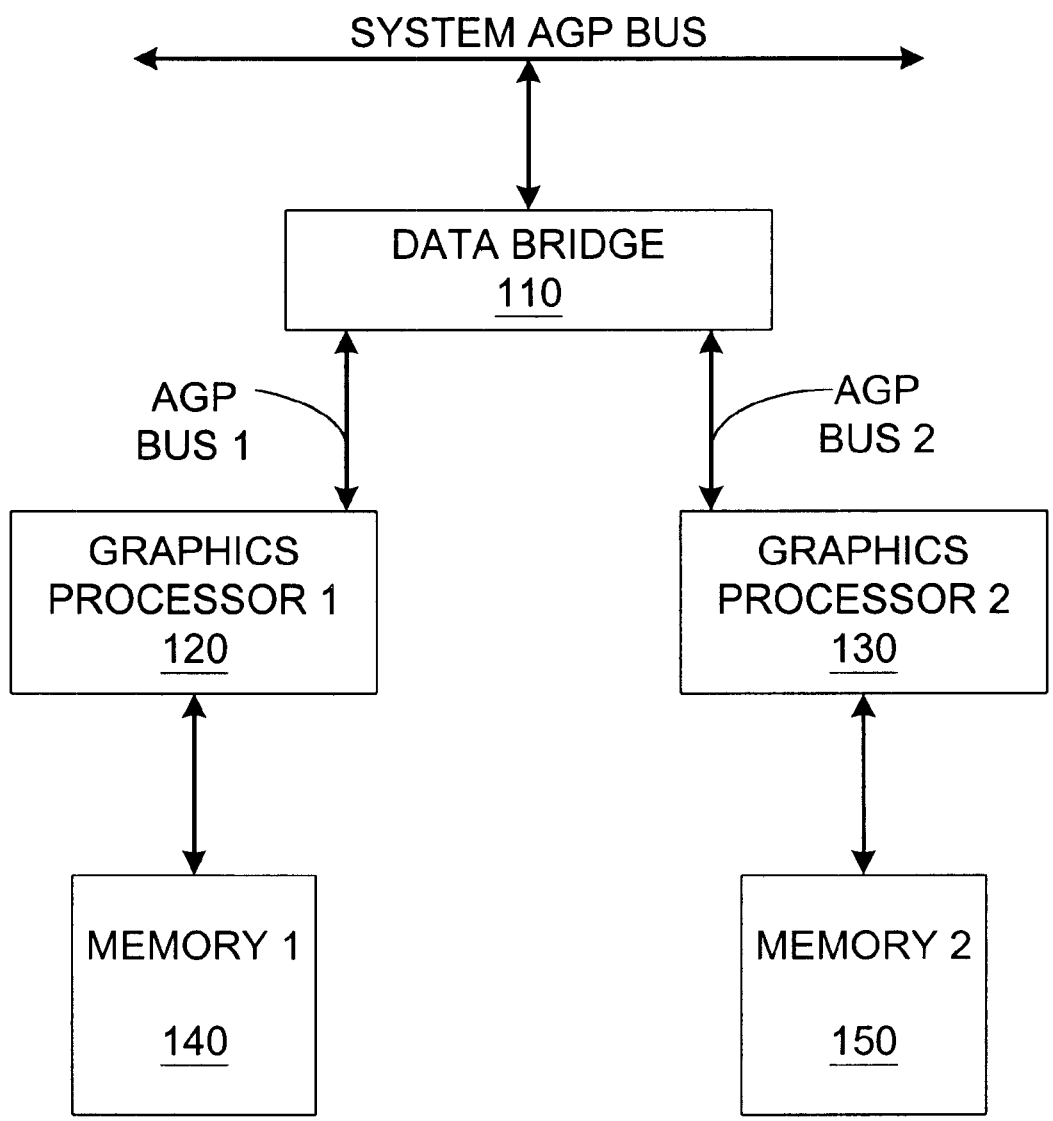
FIG. 1 illustrates, in block diagram form, a portion of a video graphics system in accordance with the present invention.

One aspect of the present invention is described with reference to the specific embodiments illustrated in FIGS. 1 through 14. FIG. 1 illustrates a portion of a video graphics system 100 in accordance with the present invention. The system portion 100 includes a data bridge 110, a first graphics processor 120, a second graphics processor 130, a first memory 140, and a second memory 150.

Data bridge 110 has a first bus interface port connected to a system bus, a second bus interface port connected to a bus interface port of the first graphics processor 120, and a third bus interface port connected to a bus interface port of the second graphics processor 130. In addition to the specific (Advance Graphics Port) AGP busses illustrated in FIG. 1, it is possible for other busses to also connect the components illustrated in FIG. 1.

The first graphics processor 120 has a first memory port connected to a first memory 140, while the second graphics processor 130 has a memory port connected to a second memory 150.

In operation, the data bridge 110 receives data, which may include graphics processor commands, over the system bus. In the specific implementation described herein, the system bus is an AGP bus, which is connected to a first bus interface port (not specifically illustrated) of the data bridge 110, which is an AGP Port. The data is generally provided by a graphics software driver (not shown), which operates on a system level processor. The graphics driver directs graphics data and/or commands to one of the two graphics processors 120 and 130 by providing destination address information. Therefore, upon receiving data from the software driver, the data bridge 110 routes the data based upon the destination address.

The second and the third bus interface ports of the data bridge 110 are both AGP ports. Having multiple AGP ports for interfacing to the graphics processors 140 and 150, and to the system processor associated with the system AGP bus represents an advantage over known systems, which only support a single graphics processor with an AGP bus.

In response to receiving data, each of the first graphics processor 120 and second graphics processor 130 will render image data into their respective memories 140 and 150. The memories 140 and 150 will generally be graphics memory devices, such as is used to support frame buffers.

In the specific implementation illustrated, the graphics memories 140 and 150 represent discrete, physically separate memories, which are directly accessed by their respective graphics processors. This allows the graphics processors to be able to access graphics data quickly.

Figure 2:
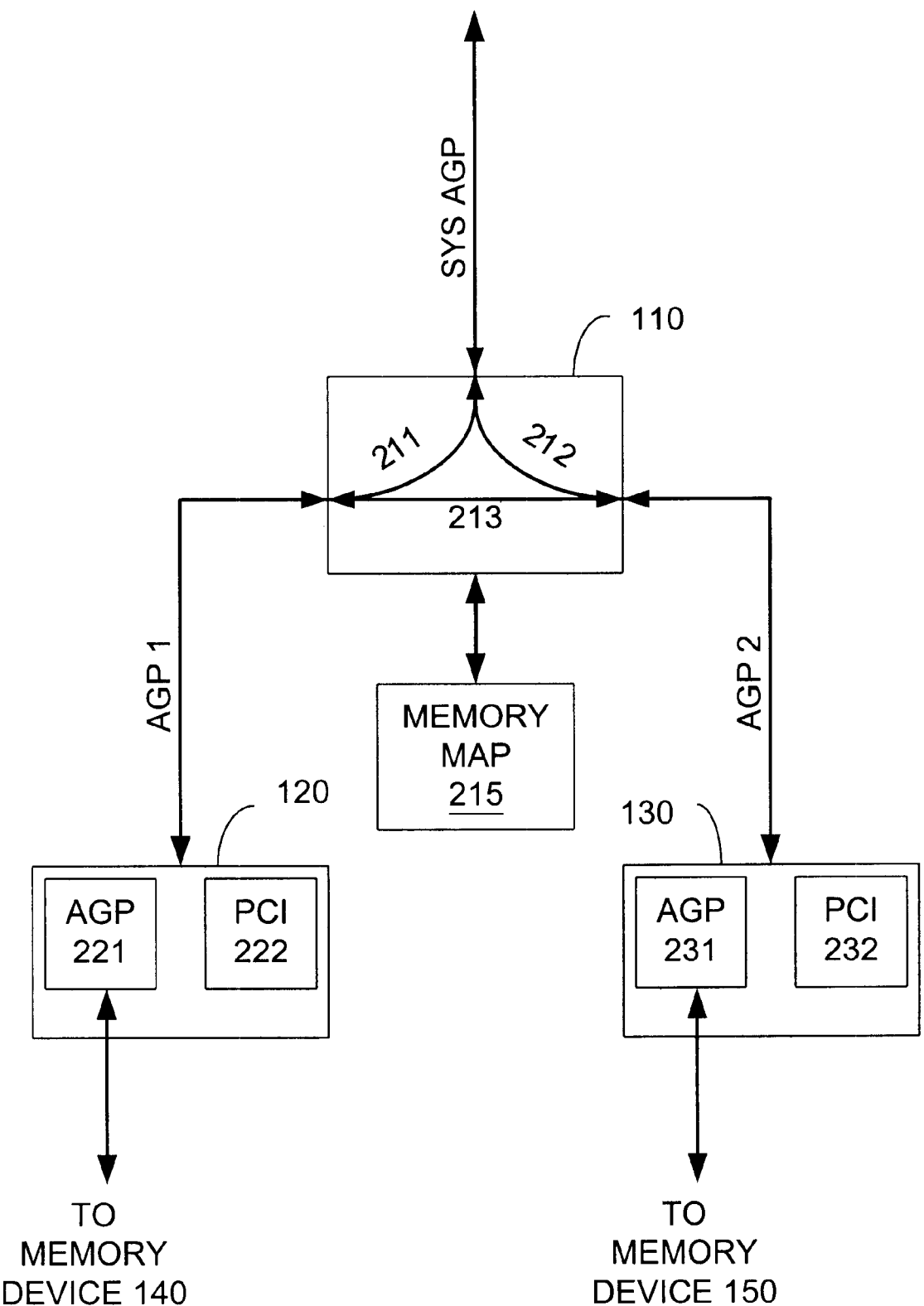
FIG. 2 illustrates, in block diagram form, a more detailed view of the system illustrated in FIG. 1.

FIG. 2 illustrates the system of FIG. 1 in greater detail. Specifically, graphics processors 120 and 130 may not only interface to AGP ports 221 and 231, but also to PCI ports 222 and 232 to access data and peripherals via a PCI bus (not shown). However, in the specific implementation of FIG. 2, only the AGP ports and controllers are discussed.

The data bridge 110 of FIG. 2 graphically illustrates that the data may be routed from any one of the bus interface ports to any second bus interface port via paths 211–213. For example, when the second graphics processor 130 makes a request to access graphics data from the memory 140 the data bridge 110 will route the request over data path 213.

The data bridge 110 optionally includes, or is connected to, a storage location for storing a memory map 215. The memory map 215 correlates the system memory map to the individual memory maps of the graphics processors 120 and 130, and is used for routing data.

Figure 3:
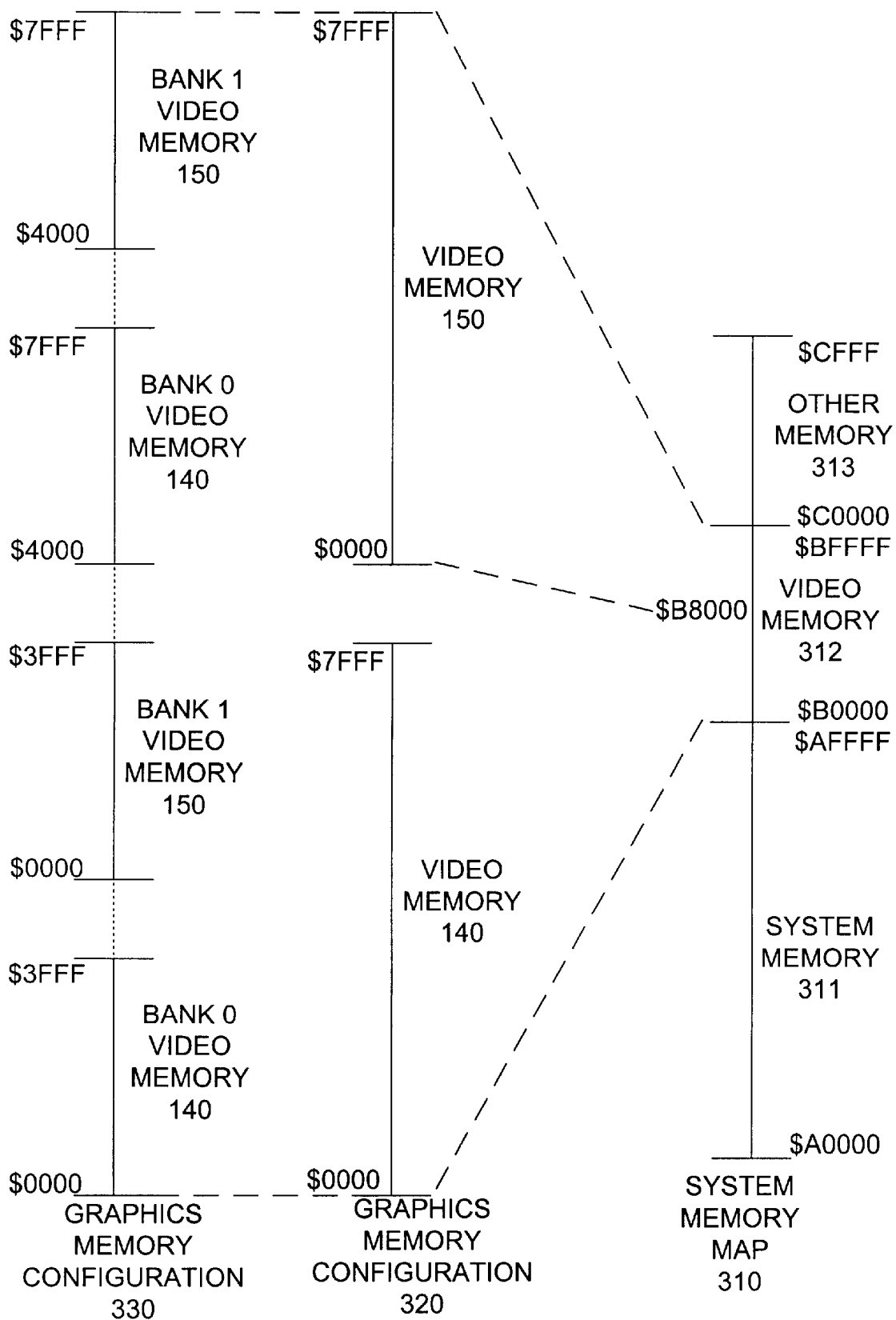
FIG. 3 illustrates a graphical representation of a memory map associated with the system of FIG. 1.

FIG. 3 illustrates a system memory map 310, and two specific embodiments, 320 and 330, of memory map configurations of the graphics memories 140 and 150. The system memory map 310 represents the virtual memory map used by the software drivers of the graphics system, and includes a system memory portion 311, a video memory portion 312, and other memory space 313.

Generally, the system memory 311 will store application code, data, and drivers associated with the system. For example, the system memory is memory used by a system processor of the system including the system portion 100 of FIG. 1. Generally, this system processor is a general-purpose processor associated with a general purpose computer system of the type illustrated in FIG. 8.

The video memory 312, defines memory space used to the support graphics processors 120 and 130. The video memory 312 may include memory embedded in the graphics processors 120 and 130, and/or memories accessed external to the graphics processors 120 and 130 as illustrated in FIG. 1.

The other memory 313 can include such things as mapped networking peripherals, input/output peripherals, or other peripheral functions associated with the system, including address mapped location of portions the graphics processors 120 and 130 themselves.

As illustrated, the system memory 311 of the system memory map 310 resides between virtual address locations $A0000 and $AFFFF, the video memory 312 resides between address locations $B0000 and $BFFFF, and the other memory 313 resides between address locations $C0000 and $CFFFF. Note that the memory maps of FIG. 3 and 8 have been selected for illustrative purposes only. It is noted that the memory maps described herein have been selected for illustrative purposes only. The values chosen are not intended to represent any specific types of data or modes of operation. In addition, one skilled in the art will recognize that in a normal video application, greater than 64 KB (kilobytes) will be used.

In a first memory mapping embodiment, the system-level video memory 312 is mapped to include the graphics memory configuration 320. As indicated by the system memory map, there is 64 KB of memory associated with the video memory address space.

The configuration 320 indicates that the video memories 140 and 150, associated with the graphics processor 120 and 130 respectively, each have 32 KB of the memory. (Note that in other embodiments, the full 64 KB of system video map can be mapped into each of the memory space of each graphics processor 120 and 130.) The memory configuration 320 indicates that the physical address of each of the video memories 140 and 150 is from $0000 to $7FFFF. It is possible for both physical memory maps to be identical because the graphics processors 120 and 130 are separate devices. This is further illustrated by example.

Figure 4:
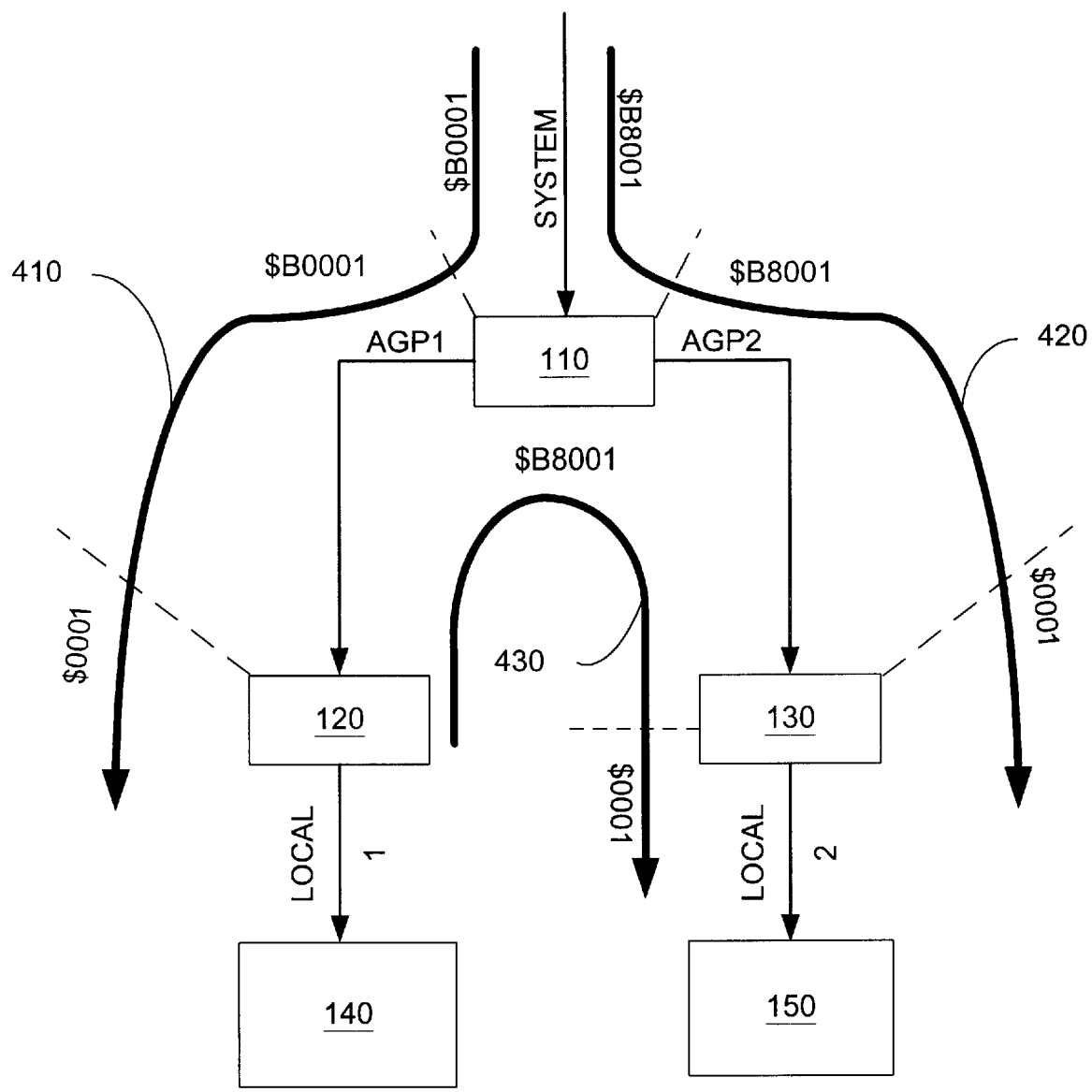
FIGS. 4–6 illustrate, in block diagram form, data flow paths through the system of FIG. 1.

FIG. 4 illustrates one embodiment as to how memory accesses are translated through the data bridge 110. A first request represented by flow 410 originates from the system, which requests address location $B0001. Consistent with the memory map of FIG. 3, this request is received by the data bridge 110 and is provided to the AGP bus labeled AGP1, because $B0001 is in the lower 32 KB of video memory associated with the graphics processor 120. At the AGP1 bus, the memory address $B0001 remains $B0001. The graphics processor 120, upon receiving the address, maps the value $B0001 to the address $0001 which represents the physical memory address of the local memory 140. It will be appreciated that in other embodiments additional memory mappings can occur between the bridge and the graphics processor, or within the graphics processor. For example, the bridge can actually map addresses received from the system before being forwarded to the graphics processor. In addition, each graphics processor can perform one or more address mappings based upon its internal address space requirements. For example, memory map 330 of FIG. 3, which supports multiple banks of local memory, will generally require additional mapping performed by the graphics processors. One example of graphics processor mapping will be discussed with reference to FIG. 7.

A second request represented by flow 420 originates from the system, and requests access of address location $B8001. Consistent with the memory map of FIG. 3, this request is received by the data bridge 110 and is provided to the AGP bus labeled AGP2. In the specific embodiment illustrated, the AGP2 bus, the memory address $B8001 remains $B8001. The graphics processor 130 maps the address value $B8001 to the address $0001, which represents the physical memory address of the local memory 140. As discussed previously, additional and/or different mappings can take place in other embodiments. For example, by having the base address register of device 130 set equal to the base address register of device 120, translations by the bridge device 110 are reduced.

Note that the data received by graphics processors 120 and 130 does not necessarily have to be stored in the memories 140 and 150. Alternative memory locations and/or registers can be mapped for use by the graphics engines, whereby the graphics engines will render data to the memories as appropriate based upon received data.

A third request over the AGP1 bus, represented by flow 430, originates from the graphic processor 120, and requests address location $B8001, which is in graphic processor 130's memory space. Consistent with the memory map of FIG. 3, the request is received by the data bridge 110 and is provided to the AGP2 bus. In the manner describe above, the graphics processor 130 maps the address value $B8001 to the address $0001 which represents the physical memory address of the local memory 150.

In response to a memory access request, the graphics processors 120 and 130 will access the data at their respective locations in memory devices 140 and 150.

Figure 5:
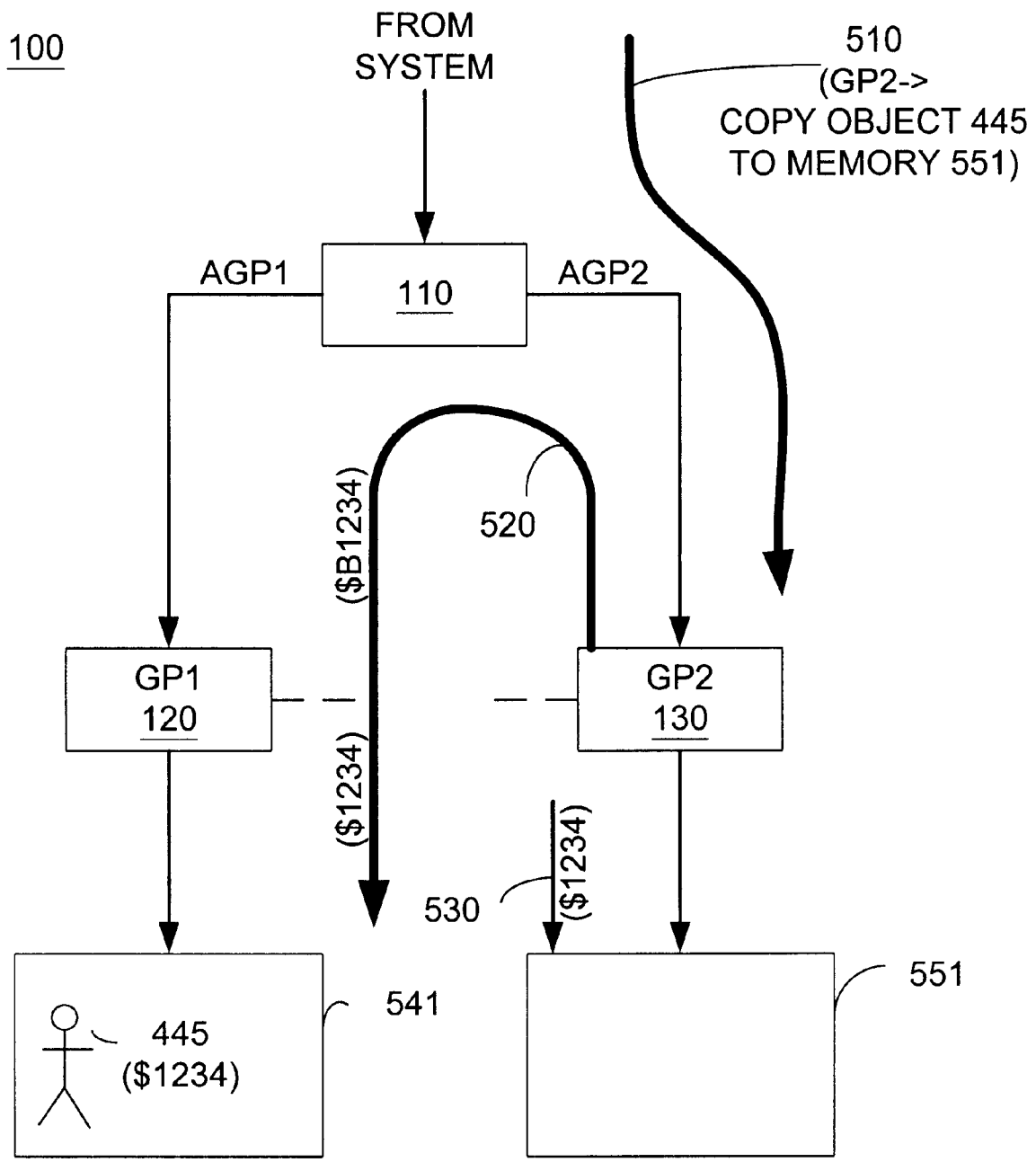

FIG. 5 illustrates the system portion 100, whereby data is sent over the system bus, through the data bridge 110, to the second graphics processor 130. As illustrated, the data being sent will cause a COPY command to be executed by the second graphics processor 130. Specifically, the COPY command specifies that the second graphics processor 130 is to copy the object 445, which starts at system memory location $B1234. As illustrated, object 445 is stored in the first memory 140, which is associated with the graphics processor 120 as shown by flow 510.

In response to the system COPY command, the graphics processor 130 will issue a read request over the AGP2 bus, represented by the data flow 520 of FIG. 5. The request specifies the data to be read begins at system address location $B1234. When the read request is received by the data bridge 110, it will route the request to the first graphics processor 120 over the AGP1 bus without mapping of the address. Upon receiving the request, the first graphics processor 120 will access the appropriate data in the memory 140 at physical address $1234 and provide this data to the data bridge 110, which in turn will route the data back to the second graphics processor 130, which will store the data, and hence the object, in a location indicated by the original command data and represented by flow indicator 530.

Figure 6:
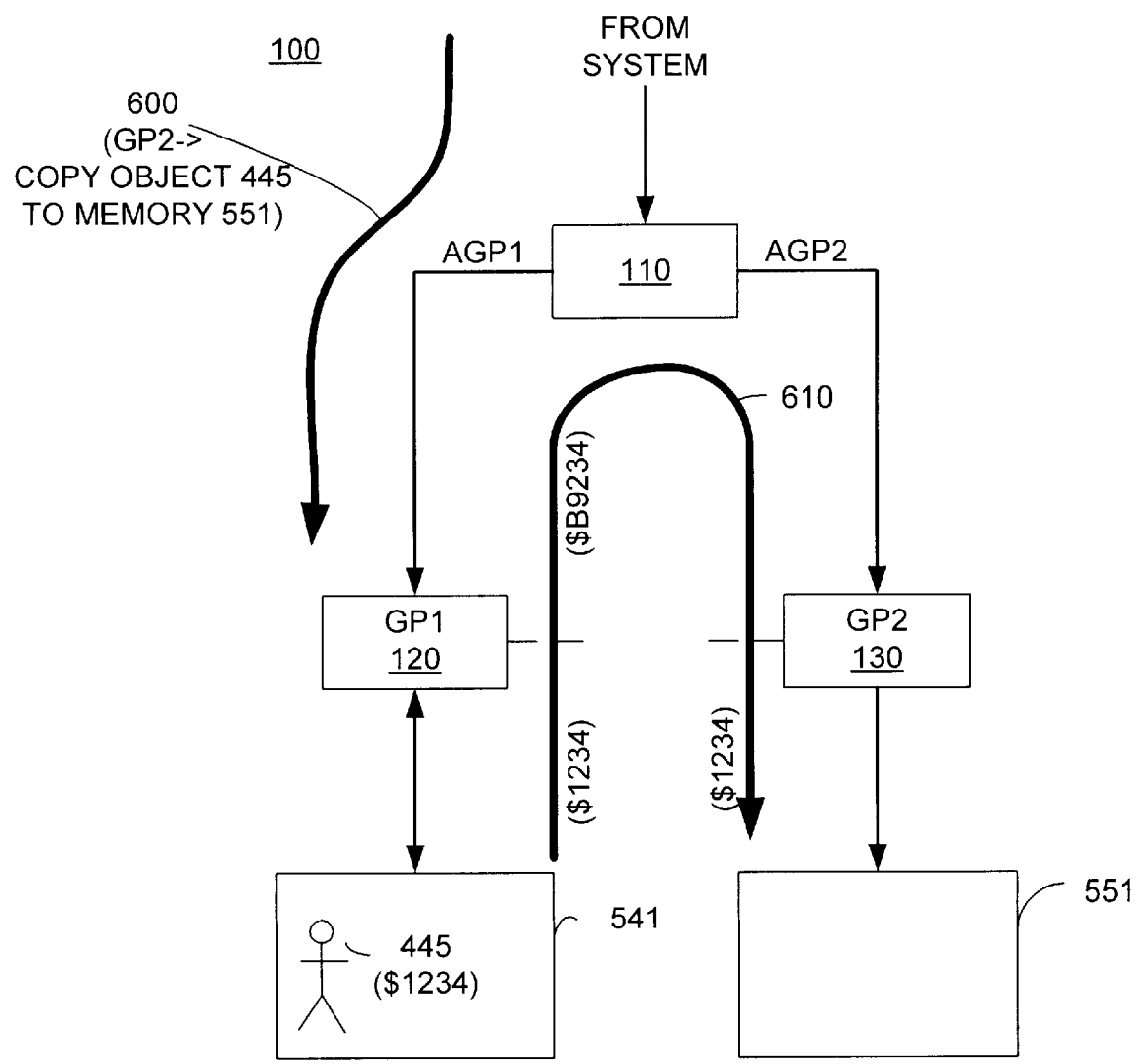

FIG. 6 illustrates the system portion 100, whereby data is sent over the system bus. through the data bridge 110, to the first graphics processor 120. As illustrated, the data being sent will cause a COPY command to be executed by the first graphics processor 120. Specifically, the COPY command specifies that the first graphics processor 120 is to copy the object 445 to memory 541, which starts at the system memory location $B9234 as shown by data flow 600. As illustrated, object 445 is stored in the second memory 551, which is associated with the graphic processor 130.

In response to the system copy command, the graphics processor 120 will issue a write request over the AGP1 to bus, represented by the data flow 610 of FIG. 6. The request specifies the data is to be written to the system address location beginning at $B9234. When the write request is received by the data bridge 110, it will route the request to the second graphics processor 130 over the AGP2 bus. Upon receiving the request, the second graphics processor 120 will access the appropriate data in the memory 551 and receives this data from the data bridge 110.

The data bridge 110 can be implemented in numerous manners. Generally, the bridge 110 will contain information capable of identifying where an address received at any of the three AGP busses is to be routed.

Figure 7:
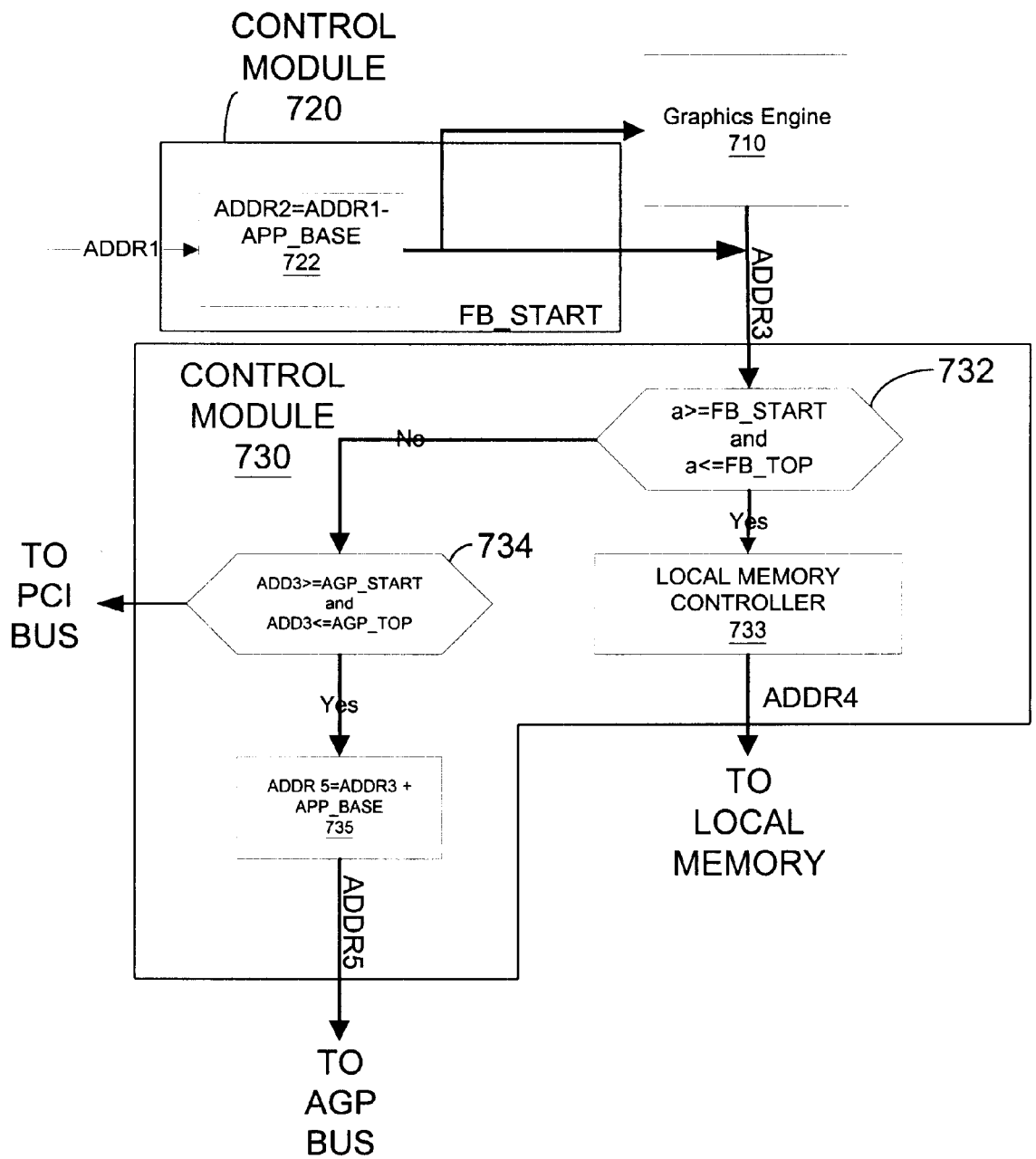
FIG. 7 illustrates, in block diagram form, a detailed view of a portion of the system of FIG. 1.

FIG. 7 illustrates a specific implementation of a graphics processor. The graphics processor of FIG. 7 includes a first control module 720, which maps the address received from the bridge 110. In one implementation, the mapping of control module 720 adjusts for the AGP offset of the graphics processor at portion 722. In a different implementation, the AGP offset can be handled by the bridge 110. For example, when the bridge 110 recognizes that the AGP address from the system bus is for a specific graphics processor, the bridge can map the System AGP address to a different address space for the specific graphics processor. The control module 720 illustrated in FIG. 7 can provide data directly to the graphics engine 710, and/or further map the address relative to the frame buffer.

The mapped address labeled ADDR3, which can be provided by either the graphics engine 710 or the scaled address of control Module 720, is received by a second control module 730. At block 732 of the control module 730, it is determined whether the received address ADD3 is within the local frame buffer. If so, flow proceeds to block 733 which is a memory controller for accessing local memory. If the address ADD3 does not reference local memory, flow proceeds to step 734 where it determined if the address ADD3 references AGP space. If not, the address ADD3 is handled by PCI control (not illustrated). If within AGP space, the flow proceeds to block 735, which maps the address to the AGP space. Note that a specific AGP bus control logic is not illustrated for such control logic is well known in the art.

Note that the graphics processor of FIG. 7 can perform additional memory mapping. For example, mapping for multiple banks of frame buffer memory, such as are illustrated in memory map 330 of FIG. 4, may need to be performed.

Figure 8:
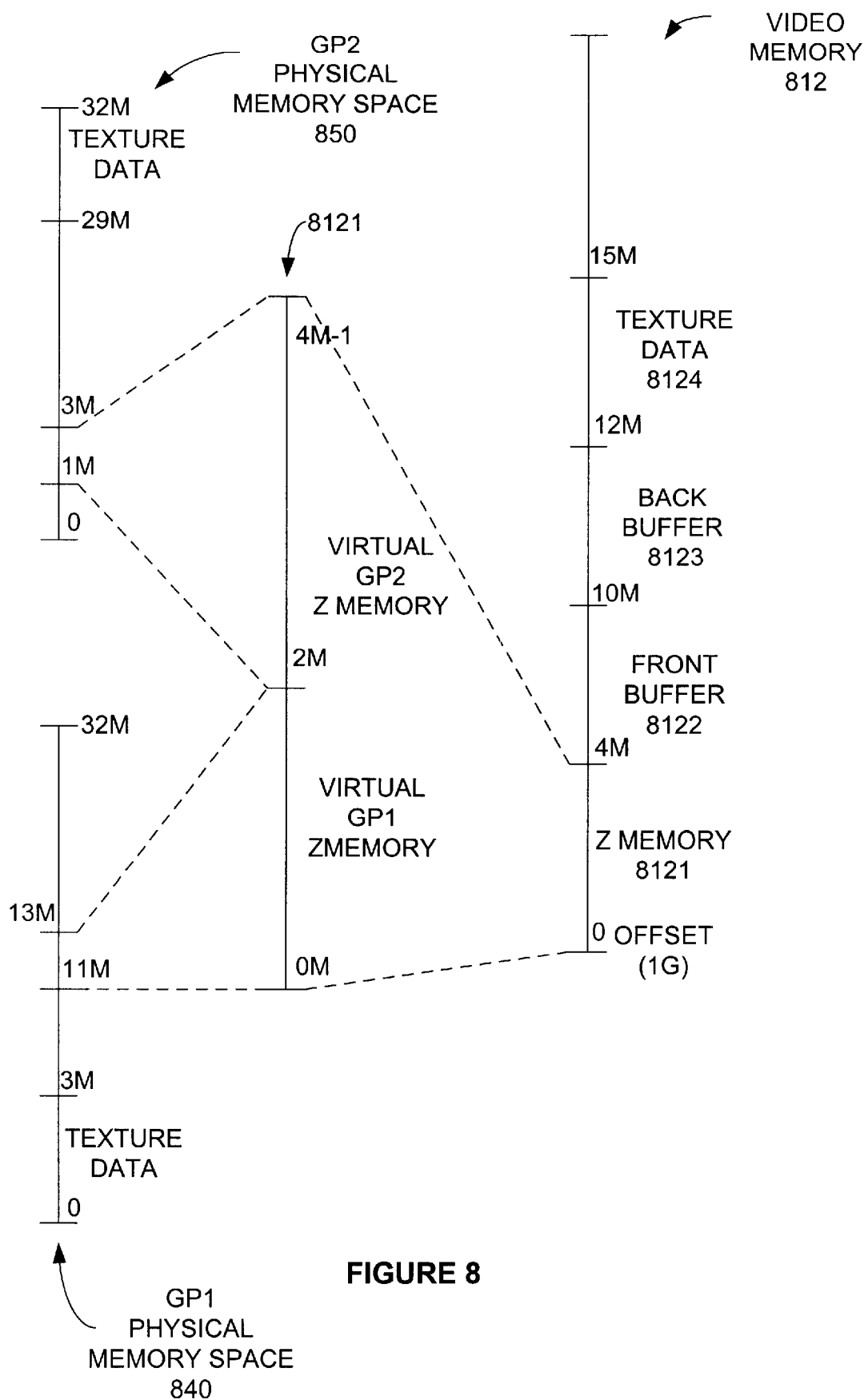
FIG. 8 illustrates a graphical representation of a memory map associated with the system of FIG. 1.

FIG. 8 illustrates an alternate memory mapping to be handled by the data bridge 110 in accordance with the present invention. Specifically, video memory 812 represents a virtual memory map of video memory with respect to the host. The memory map includes a continuous portion of memory 8121 for graphics Z data, a continuous portion of memory 8122 for front buffer data, a continuous portion of memory 8123 for back buffer data, and a continuous portion of memory 8124 for texture data. In other embodiments, a plurality of front and back buffers can be supported by additional memory portions.

In accordance with the present invention, each of the continuous memory portions 8121–8124 will be routed to one or more data channels associated with data bridge 110. As illustrated in FIG. 8, 4M of address space is used to store Z data in memory portion 8121. In a specific embodiment, the lower half of the memory portion 8121 is virtual address space associated with a first graphics processor, while the upper half of the memory portion 8121 represents virtual addresses space associated with a second graphics processor.

The specific memory map of FIG. 8 maps the lower portion of the host's virtual memory portion 8121, which is in the address range of 1 GB to 1 GB+2 MB, to the physical address range of 11 MB to 13 MB of the first graphics processor (associated with the first channel) 840. The upper portion of the host's virtual memory portion 8121, which is the address range of 1G+2 MB to 1 GB+4 MB, is mapped to the physical address range of 1 MB to 3 MB of the second graphics processor (associated with the second channel) 850. It is to be understood that the specific mapping of FIG. 8 is for illustrative purposes only.

FIG. 9 illustrates a specific implementation of the memory map 215 of FIG. 2. Specifically, FIG. 9 illustrates a first plurality of register sets 910 associated with a device connected to a first data channel (CH1), and a second plurality of register sets 920 associated with a device connected to a second data channel (CH2). The first data channel is associated with the first AGP channel of data bridge 110. The second data channel is associated with the second AGP channel of data bridge 110.

Each register set within the plurality of register sets 910 and 920 indicates how a specific range of data of a specific type is to be mapped. For purposes of discussion, each register set is associated with a specific type of data, as indicated in column 1. For example a first register set is for Z data.

In the embodiment illustrated in FIG. 9, each register set includes a host offset register, an offset range register, and a channel offset register, represented by columns 2 through 4 respectively.

The host offset register stores a value that specifies the starting address location of an address range associated with a host system. It should be noted the term host system is being used to indicate a common configuration having a host system, such as a general purpose processor, which provides data access requests to data bridge 110. With respect to the Z data register set of the plurality of registers 910, the host offset register stores to a value of 1G. This value represents the starting location of the virtual memory portion 8121 of FIG. 8.

The value associated with the offset range register indicates the address range of addresses relative to the host offset register that are to be mapped based upon the register set. Specifically, the Z data register set of registers 910, has an offset range value of 2M. This corresponds to the lower half of the Z memory 8121.

The value associated with the channel offset register indicates the starting location of the address range of a device connected to the indicated channel to where the host addresses are to be mapped. With respect to the Z data register set of the plurality of registers 910, the channel offset value has been programmed to 11M.

Figure 10:
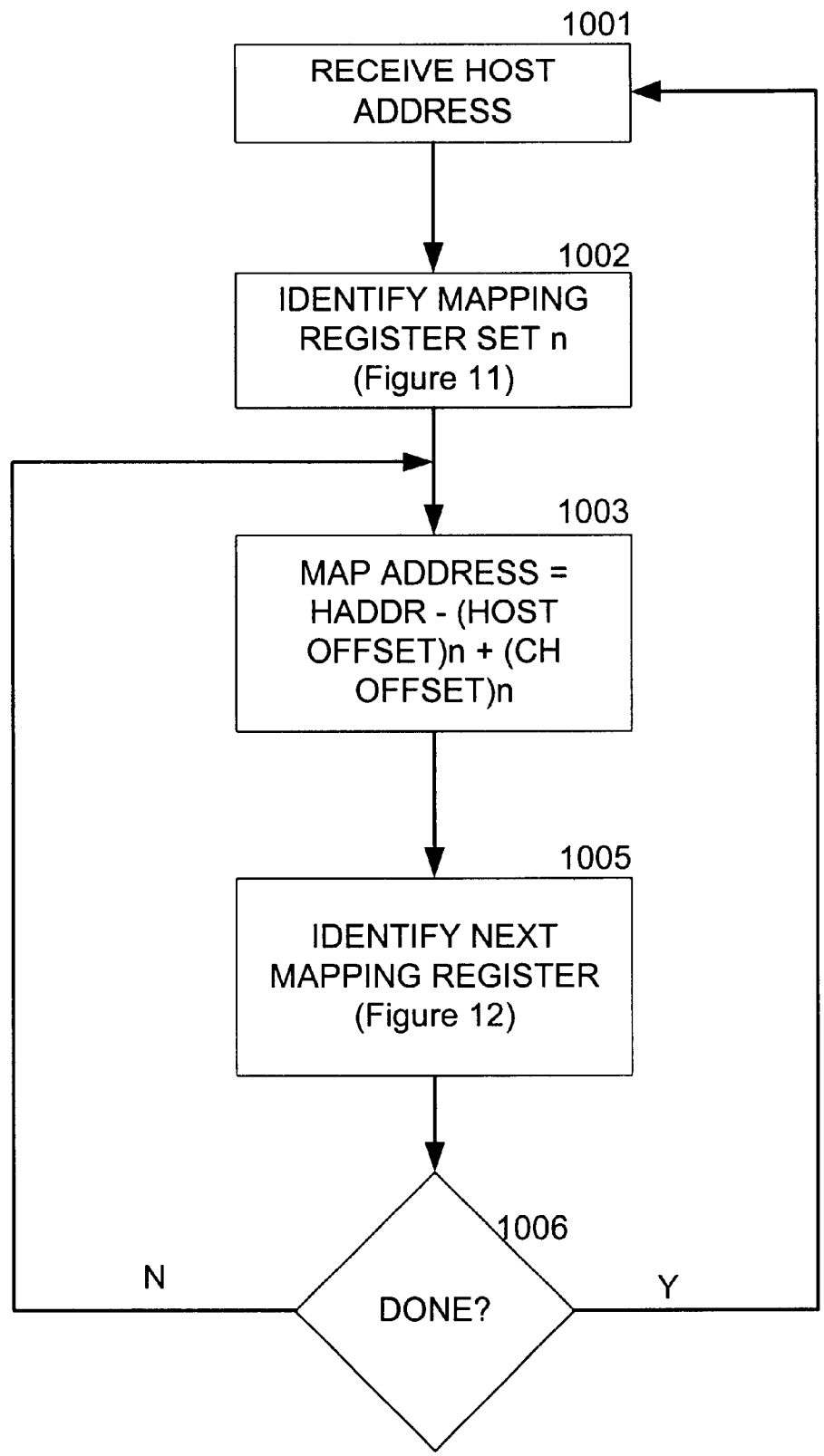
FIGS. 10–12 illustrate, in flow diagram form, a method in accordance with the present invention.
Figure 11:
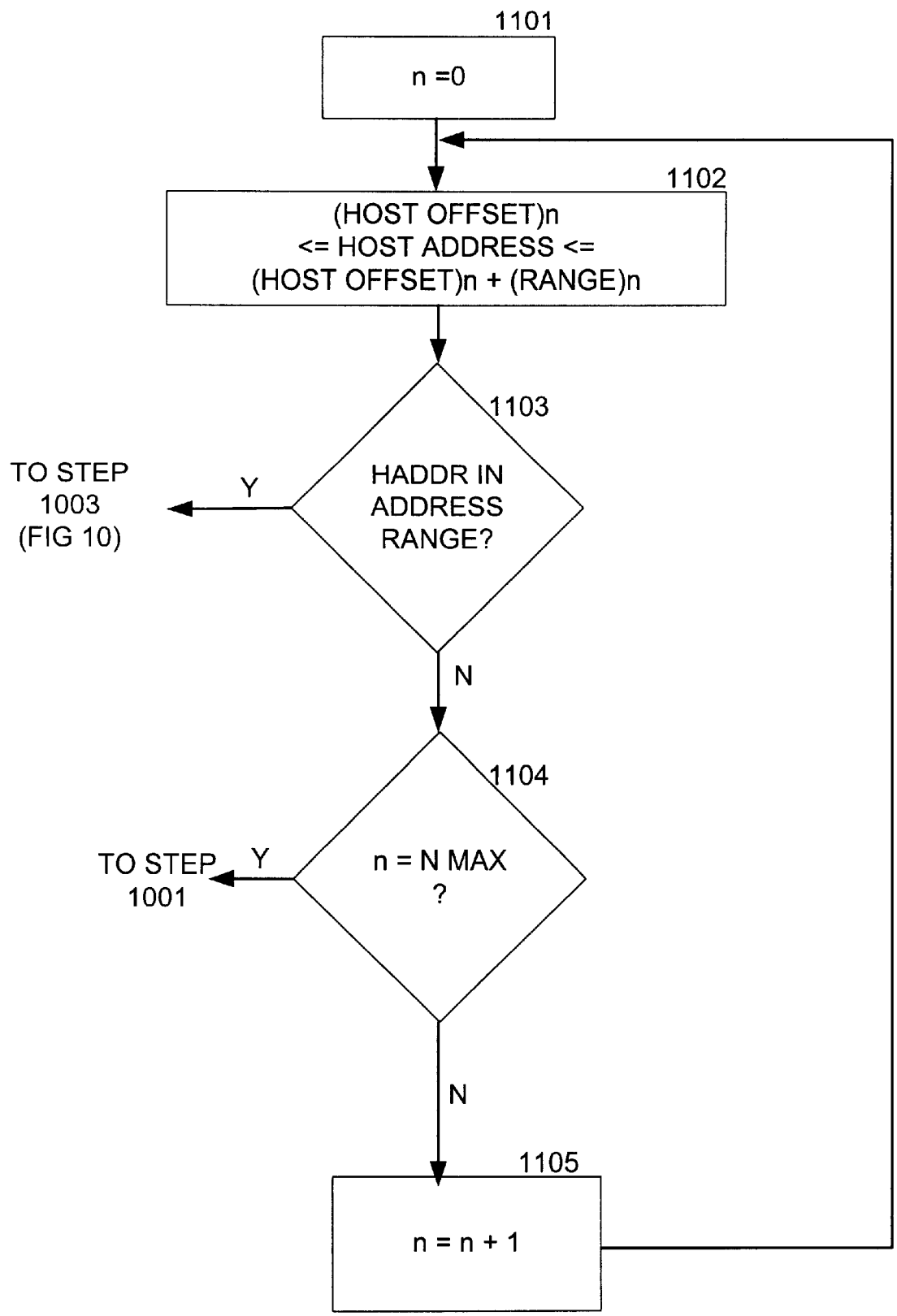
Figure 12:
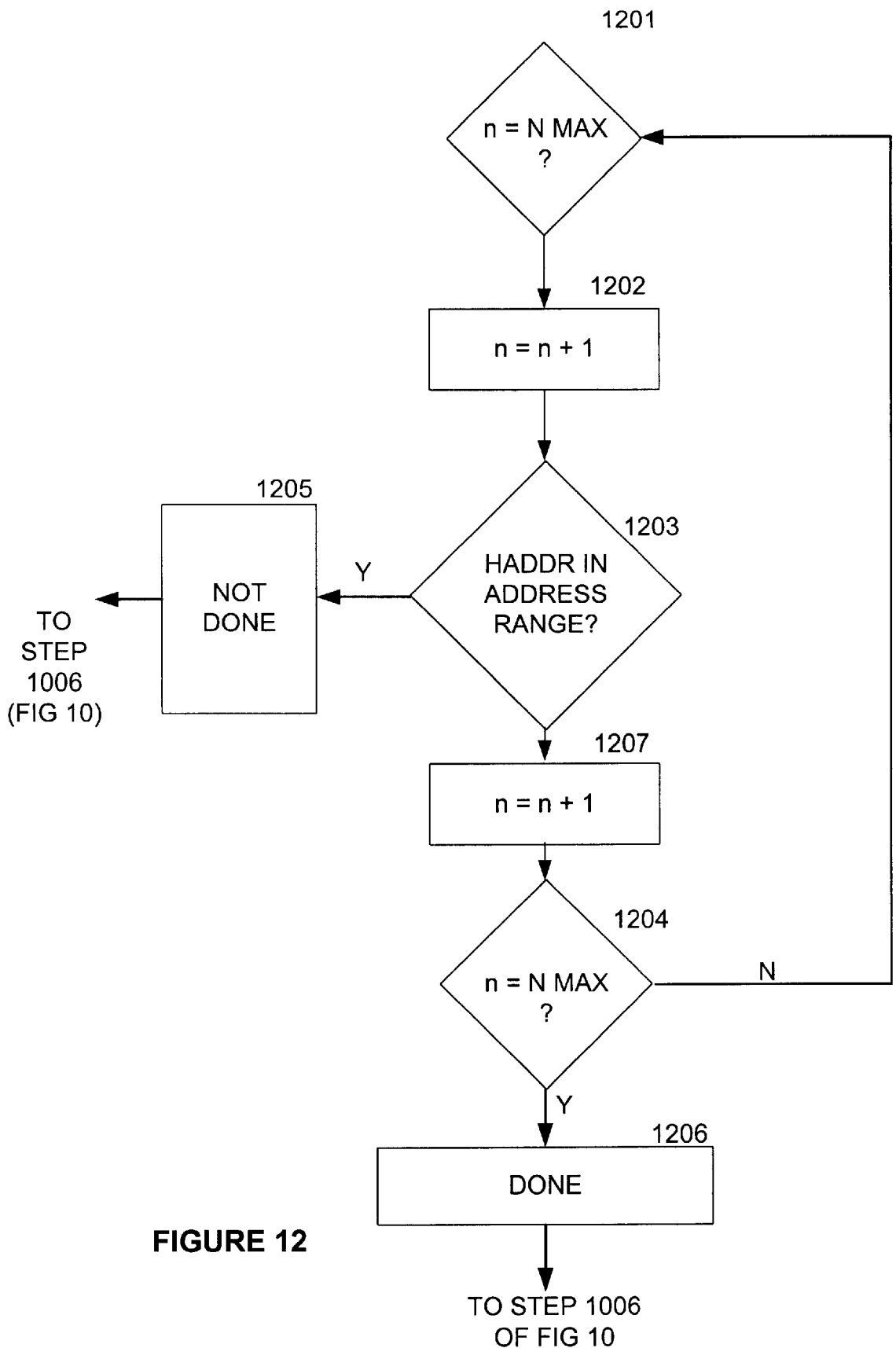

FIGS. 10–12 illustrate a specific method implemented by data bridge 110 using a register set of FIG. 9 to route data access requests to a channel associated with one of the graphics processors.

At step 1001 of FIG. 10, an access request that includes a host address is received.

At step 1002 a specific register set of the plurality of register sets is identified that includes the host address. When the identified register set is associated with the plurality of register sets 910, the subsequent mapping is to the first channel of bridge 110. Likewise, when the register set is associated with the plurality of register sets 920, the subsequent mapping is to the second channel of bridge 110. Specific substeps associated with step 1002 are discussed with reference to FIG. 11.

At step 1003, the received host address is mapped to the specific channel by subtracting the host offset register value from the received host address and adding in the channel offset register value. The resulting value identifies the mapped address of the graphics processor associated with the channel being accessed.

At step 1005, an attempt to identify a next specific register set of the plurality of register sets 910 and 920 is identified. Specific subsets associated with the step 1005 are further described with reference to FIG. 12.

At step 1006, a determination is made whether or not step 1005 identified a next valid mapping register. If a valid mapping register was identified, the flow proceeds to step 1003. If no valid mapping register was identified, the flow proceeds to step 1001.

FIG. 11 illustrates specific sub steps associated with step 1002 of FIG. 10.

At step 1101, register set identifier N is set equal to 0.

At step 1102, a calculation is used to determine whether or not the host address is within the range specified by the register set associated with the identifier N. Note that with respect to FIG. 9, the register set associated with the value 0 is the Z data type register set of the plurality of register sets 910, while the texture data type register set of the plurality of register sets 920 would have a value 7.

At step 1103, the results of the calculation of step 1102 are used to determine whether or not the host address is within the host address range. If so, flow proceeds to step 1003 of FIG. 10. If not, flow proceeds to step 1104.

At step 1104, a determination is made whether or not the value N is equal to a maximum value N. With reference to the register sets of Figure nine, the maximum value N would be 7, indicating that the range of all register sets has been checked. Therefore, if N is equal to the maximum value of N, the host address value is not included in any of the range of the plurality of register sets, and flow proceeds to step 1001 of FIG. 10, thereby ignoring the received host access request. If N is not equal to the maximum value of N, the flow proceeds to step 1105.

At step 1105, N is incremented, and flow proceeds to step 1102.

FIG. 12 illustrates specific sub steps associated with step 1005 of FIG. 10. At step 1201, a determination is made whether the current value N is equal to a maximum value of N. If so, all register sets have been evaluated and flow proceeds to step 1206. If not, flow proceeds to step 1202.

At step 1202, n is incremented.

At step 1203, a determination is made whether the host address is in the address range of the current register set. This determination is made using a calculation similar to the calculation discussed with reference to step 1102 of FIG. 11. If within the address range, the flow proceeds to step 1205, where it is indicated the method of FIG. 10 is not done, and flow proceeds to step 1006 of FIG. 10. If not within the address range, the flow proceeds to step 1207.

At step 1207 N is incremented.

At step 1204, a determination is made whether the current value of N exceeds a maximum value of N. If not, flow proceeds to step 1203. If so, flow proceeds to step 1206 where it is indicated the method of FIG. 10 is done, and flow proceeds to step 1006 of FIG. 10.

The specific method of FIG. 10 allows for any address range to be mapped exclusively to a single channel of data bridge 110, or to be mapped to multiple channels of data bridge 110. For example, it may be desirable to map a specific host memory range to a single channel when the data associated with the range is a specific object needed only by a single graphics processor, which is responsible for its rendering. Examples of such data would include Z data, front buffer data, and back buffer data. However, when the host memory range represents a data type such as texture data, which is generally used by many objects, it may be desirable to map the specific host memory range to multiple graphics processors.

Figure 13:
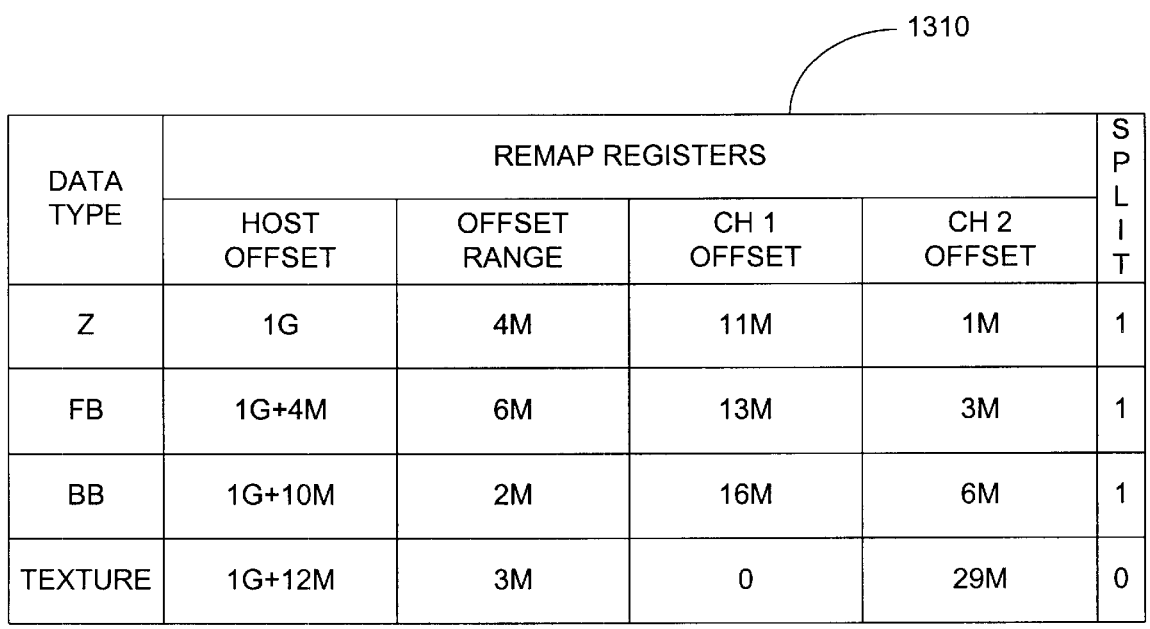
FIG. 13 illustrates, in tabular form, values associated with a plurality of register sets.

FIG. 13 illustrates an alternate plurality of register sets 1310. For purposes of illustration, each register set within the plurality of register sets 1310 are associated with the specific data type. Each register set includes a host offset register, an offset range register, a channel 1 offset register, a channel 2 offset register, and a split indication register.

The host offset register and offset range register have been described previously with reference to FIG. 9.

The channel 1 and channel 2 offset registers store values specifying offset values associated with devices coupled to each respective channel. For example, with respect to the memory map of FIG. 9, the value stored in the Z data type register set indicates the host offset register being set to 1G, the offset range register being set to a value of 4M, the channel 1 offset register being set to a value of 11M, the channel to offset register being set to a value of 1M, and to split indication register value been asserted (set equal 1).

The split indication register value indicates whether or not the data range indicated by the register set is to be split among the channel 1 and channel 2 devices, or if the data range is to be routed to both channel devices.

When asserted, the split indication register indicates that the lower half of the offset range is to be routed to the channel 1 device, and the upper half of the offset range is to be routed to the channel 2 device. When not asserted, the split register indicates that the data range is to be routed to both channel devices.

The ability to route specific data range is to one or more channels is useful in the graphics processing industry, where depending upon system configuration, and type of data been access, one or more graphics processing devices may need data. By allowing a single host data transfer to be routed to multiple graphics processors, bandwidth on the system bus is reduced.

The specific implementation of using a multiple graphics processor system as illustrated in FIGS. 1–13 is advantageous over prior methods and systems, in that allows for each of the individual graphics processors have direct access to graphics data generated by other graphics processors without using bandwidth of the system AGP Bus, or by using slower busses. This is advantageous in that it allows for each of the graphics processors to render video frames either sequentially or in parallel without losing efficiencies associated with the reuse of such graphics data. For example, the first graphics processor 120 can render or store texture data for a frame, while the second graphics processor 130 renders destination or Z data for the frame. However, before displaying its data, the second graphics processor can access and use the texture data of the first graphics processor 120 to complete the image. Likewise, a complete image portion of a previous frame can be copied from one graphics processor's memory to the other graphics processor's memory using the present invention without system bus bandwidth being used. Therefore, the present invention allows for the use of multiple graphics processors having access to graphics data rendered by any of multiple processors over an AGP bus.

It should be noted that variations may be made to the present invention without departing from the spirit and scope of the present invention as defined in the claims. For example, the offset range for plurality of registers 920 of FIG. 9 can be based upon the offset range values indicated by the plurality of register sets by 910. In another embodiment, a routing table or routing register entry can define a block of memory that is, by default, to be stored in the physical memory associated with both channels (e.g. 4 Megabytes of system memory map is mapped to 4 Megabytes of physical space in each processor). However, a separate entry can specify locations within the block that are to be sent to only a single channel.

Figure 14:
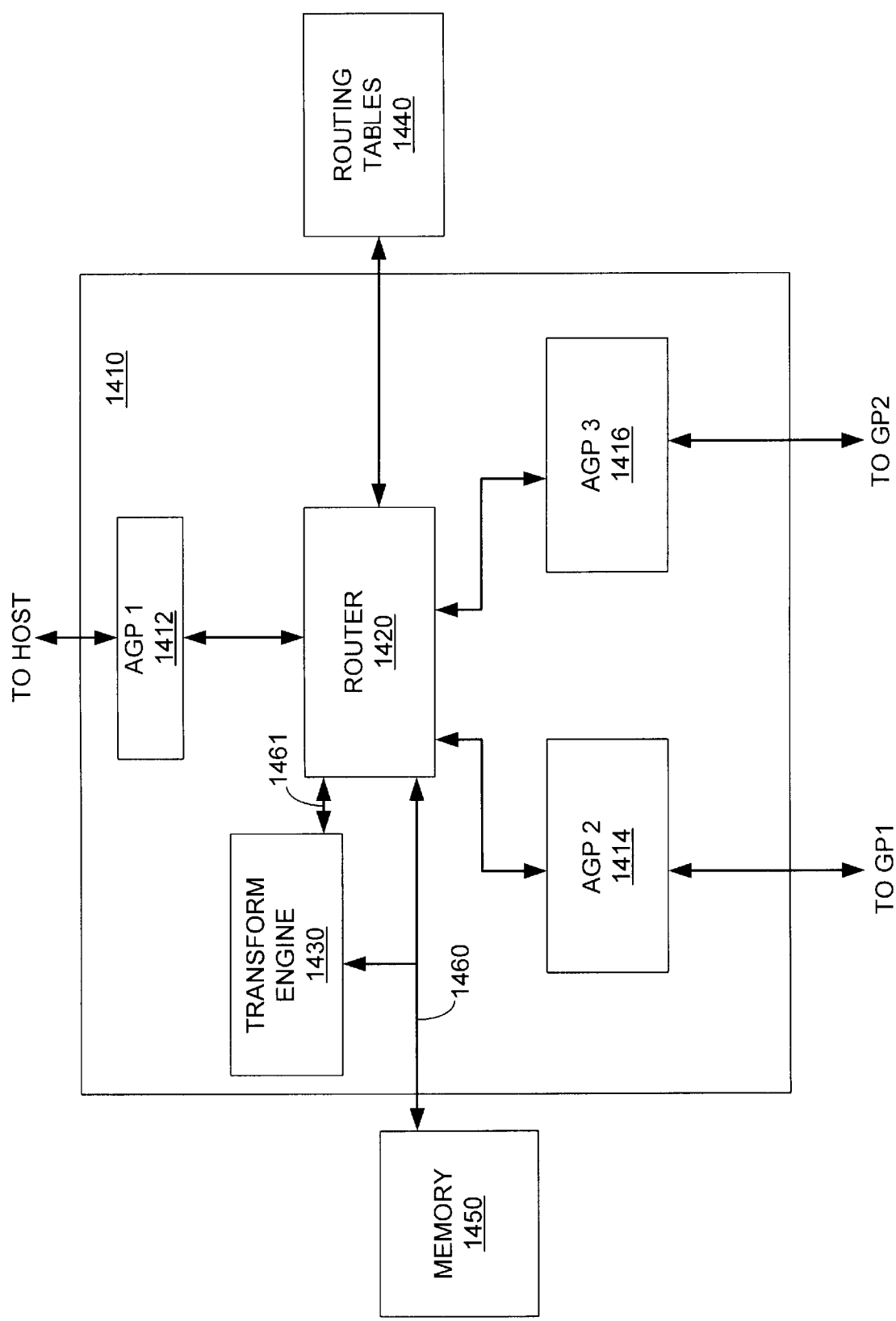
FIG. 14 illustrates, in block diagram form, a data bridge in accordance with a specific embodiment of the present invention.

FIG. 14 illustrates an alternate embodiment of a data bridge. The data bridge 1410 includes a first AGP interface portion 1412, a second AGP interface portion 1414, a third AGP interface portion 1416, a router 1420, and the transform engine 1430. In addition, FIG. 14 illustrates routing table 1440 and memory 1450, which may be integrated as part of the data bridge 1410, or physically separate from the data bridge 1410.

The AGP interface portions 1412, 1414, and 1416 provide control and interface support to external processing devices, which are connected to ports of the bridge 1410 over separate AGP buses. Each one of the AGP interface portions 1412, 1414, and 1416 are connected to one of three ports associated with the router 1420. The transform engine 1430, router 1420, and memory 1450 are connected to a common bus 1460, which provides access to the memory 1450. Typically, the memory 1450 is a SDRAM, or a DDR SDRAM (Double Data Rate Synchronous Dynamic Random Access Memory). In addition to the bus 1460, the router 1420 can be connected to the transform engine 1430 by a separate control line 1461.

In a first mode of operation, the router 1420 operates to route data associated with a memory access request to one or more devices based upon the address of the requested address, through the use of tables 1440 or routing registers, as previously described herein. In a second mode of operation, the router 1420 operates to route data to one or more devices based upon the translated location of an object represented by the received data. Whether a specific access is a first mode access or a second mode access can be based upon a register value, a fixed indicator, such as a strap, or specified by the received data. The second mode of operation is better understood with respect to the method illustrated in FIG. 15.

At step 1501 the bridge receives an object description. With reference to the specific embodiment FIG. 14, an object description is received from a host at the AGP interface portion 1412. The object description can be sent to the AGP interface portion 1412 from the host, or can be fetched from the host by the AGP interface portion 1412. For example, in a specific embodiment, the data bridge 1410 can include Direct Memory Access (DMA) hardware that is programmed by the host, or other device, to fetch data via the AGP interface portion 1412.

An object description can include a description of one or more primitive graphic elements. A primitive graphic element (primitive) generally refers to a basic shape, such as a point, line, or triangle, that, when used in combination with other primitives, describes more complicated shapes. In 3D applications, a 3-D primitive is a collection of vertices that form a single 3-D object. For example, one simple primitive is a triangle, which can be combined with other triangles to form large, complex polygons and meshes.

The object description will generally include spatial coordinates, color information, texture information, normal orientation information of the object, and light information. The spatial coordinates are referred to herein as object coordinates or the received object coordinates, which define the object in terms of a local coordinate system.

At step 1502, the bridge receives an object transformation matrix. Object transformation matrices are well-known in the graphics processing industry to include information that describes how a particular object is to be transformed between object space (model space), world space, view space, and projection space.

For example, the transformation matrix can include data to transform the object from object space to world space. This transformation, referred to as a world transformation, converts the object coordinates from their local coordinate system to a coordinate system (world coordinate system) that is used by all the objects in a scene.

In addition, the transformation matrix can include data to transform the object from its location in world space to a camera space. A transform to camera space transforms an object from world space to a specific point-of-view for the scene. Therefore, world coordinates are relocated and rotated around the camera's view, turning world space into camera space.

Yet additional transformation matrix information includes data to transform the object from camera space to view space. Specifically, in order to give the illusion of depth to a scene, objects in camera space can be scaled with relation to their distance from the viewer. For example, close objects are made to appear larger than distant objects.

At step 1503, a calculation is performed to determine the projection coordinates (X', Y', Z') of the received object (X, Y, Z) based upon the transformation matrix. One of ordinary skill in the art will recognize that any coordinate point can be transformed into another point with matrix arithmetic using a 4×4 matrix. Furthermore, the transformations from object space, to world space, to camera space, to projection space can be combined into a single matrix.

The resulting projection coordinates describe the object with respect to a projection space. Furthermore, the projection space includes a portion that is to be displayed on a display device. For example, a projection coordinate of (0,0,0) can represent a specific display device location, such as the center, or the lower left corner. For example, referring to FIG. 16, a display view area 1605, which is that portion of the projection space viewable on a display device, is illustrated having a projection coordinate of (0,0,0) assigned to the lower left corner.

Figure 16:
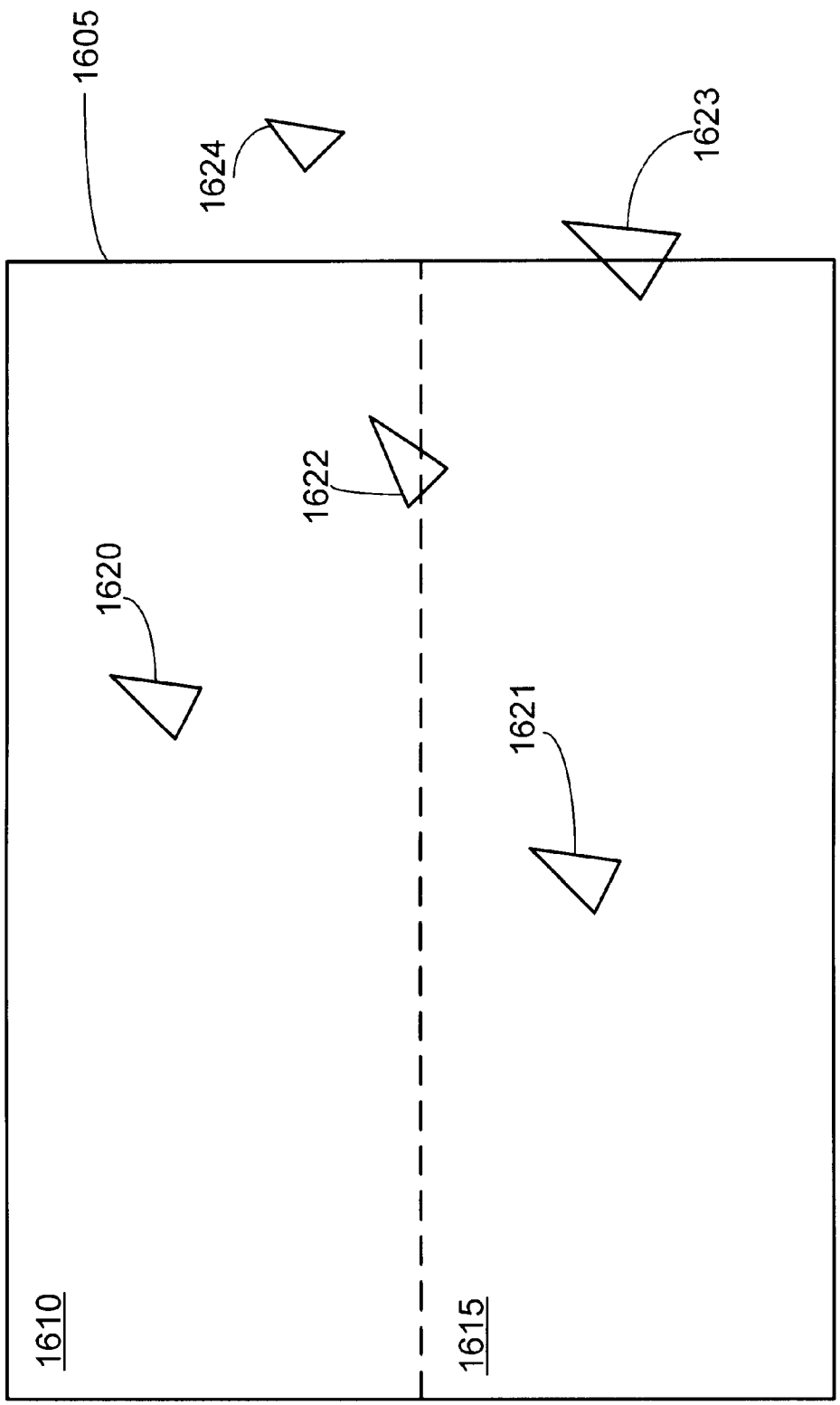
FIG. 16 illustrates, in block diagram form, a plurality of shape relative to a viewable area.

It will be appreciated that the projection location of an object may reside outside the bounds of a display device. For example, FIG. 16 illustrates triangles 1620 through 1624. In a specific embodiment, the triangles 1620 through 1624 represent a common object description having been transformed by various transformation matrices. The resulting triangles have varying projection coordinates, resulting in their different orientations. For example, the triangles 1620–1622 are entirely within the display view area 1605, the triangle 1623 is partially within the display view area 1605, and the triangle 1524 is entirely outside the display view area 1605.

At step 1599, it is determined whether the projection coordinates of the object are at least partially within a first region. The viewable area 1610 of FIG. 16 represents one example of a first region. The viewable area 1610 is defined to be an upper portion of display view area 1605. The determination of step 1599 is affirmative if a portion of the shape defined by the projection coordinates of the received object is at least partially within the display view area 1610. For example, the triangles 1620 and 1622 are both at least partially within the display view area 1610. Conversely, the triangles 1621, 1623, and 1624 are not even partially within the first region, defined by the viewable area 1610.

When the projection coordinates are at least partially within the first region, the flow proceeds to step 1504, otherwise flow proceeds to step 1598.

At step 1504, the object description is transmitted to a first graphics device for rendering. Referring to FIG. 16, the viewable area 1610, which is a predefined area, represents a portion of the display view area 1605 that is rendered by a first graphics device. Likewise, the viewable area 1615 represents a portion of the display view area 1605 that is rendered by a second graphics device. The first graphics device (not illustrated) needs the entire object description to render even a portion of the image. However, the first graphics processor has no need for object descriptions that are not to be displayed within the viewable area 1610.

In the specific embodiment illustrated in FIG. 16, the viewable area 1610 is a predefined portion of the display view area 1605. For example, as illustrated in FIG. 16, the value X is a percentage that identifies a lower portion of the display view area 1605 that is to be rendered by a second graphics processor, while the value 100-X is a percentage that identifies an upper portion of the display view area 1605 that is to be rendered by a first graphics processor. Depending upon the specific embodiment, the value X can be a fixed predefined value, the user programmable predefined value, or a dynamically changed predefined value. Note, one of ordinary skill in the art will appreciate that the display view area 1605 can be partitioned based on information other than a single percentage. For example, specific line, row, or pixel information can be used to specify specific partitioning among processors.

At step 1505, a first object count is incremented. The first object count indicates a total number of object descriptions and primitive descriptions that have been transmitted to the first graphics device. The use of the first object count will be described in greater detail below. Flow proceeds to step 1598.

At step 1598, it is determined whether the projection coordinates of the received object are at least partially within a second region. The viewable area 1615 of FIG. 16 represents one example of a second region. The viewable area 1615 is defined to be an upper portion of display view area 1605. The determination of step 1599 is positive if a portion of the shape defined by the projection coordinates of the received object is at least partially within the display view area 1615. For example, the triangles 1621 and 1623 are both at least partially within the display view area 1615. Conversely, the triangles 1620, 1622, and 1624 are not even partially within the second region defined by the display view area 1615.

When the projection coordinates are least partially within the second region the flow proceeds to step 1506, otherwise flow proceeds to step 1597.

At step 1506, the object description is transmitted to a first graphics device. Referring to FIG. 16, the viewable area 1615, which is a predefined area, represents a portion of the display view area 1605 which is rendered by a second graphics device. Where an object is at least partially within the viewable area 1615, the second graphics device (not illustrated) needs the object description to render that image portion within its region. However, the second graphics processor has no need for object descriptions that are not to be displayed within the viewable area 1615.

At step 1507, a second object count is incremented to indicate that an object description has been transmitted to the second graphics device. The workload being performed by each of the first and second graphics processors can be estimated by maintaining the first and second object counts.

For example, if, over a specific period of time, it is determined that the second graphics processor received twice as many object descriptions, or primitives, as the first graphics processor, it can be estimated that the second graphics processor has a workload that is twice that of the first graphics processor.

In a system capable of dynamically allocating the portion of the display view area 1605 being rendered by each of the graphics processors, the count information can be used to change the value of X. For example, by providing a smaller value to X, a greater portion of the object descriptions will presumably be sent to the first graphics processor, thereby reducing the workload on the second graphics processor. In this manner, a balanced workload can be maintained.

The ability to manage workload in the described manner is independent of the specific application. For example, some applications, such as land-based adventure games, render images representing sky. Generally, sky images have a relatively low amount of object description data associated with their rendering, and are displayed near the top of the monitor. Therefore, it would generally be desirable for the value X to represent less than 50 percent of display view area 1605 for sky based applications, since rendering sky is generally not data-intensive. However, for other applications, the more data-intensive graphical operations may actually occur near the top of the screen, thereby being generally desirable for the value X to represent greater than 50 percent of the display view area 1605. Therefore, by maintaining first and second counts as described in steps 1505 and 1507, the allocation of workload among graphics devices can be made dynamically without any knowledge of the specific application.

Next, at step 1597, it is determined whether an object is entirely within a third region. Referring to FIG. 16, the object 1624 is in a third region that is entirely outside the display view area 1605. Because the object 1624 is outside of display view area 1605, the object description is not transmitted to either the first or second graphics processor.

At step 1508, a third object count is incremented. The third object count can be used to determine total percentage of object descriptions been sent to either the first graphics processor or the second graphics processor. Note that an alternate embodiment, where the third object count is not maintained, the determination of step 1597 would also be unneeded, since the data is not used by any processor, instead the flow will return to step 1601.

Figure 15:
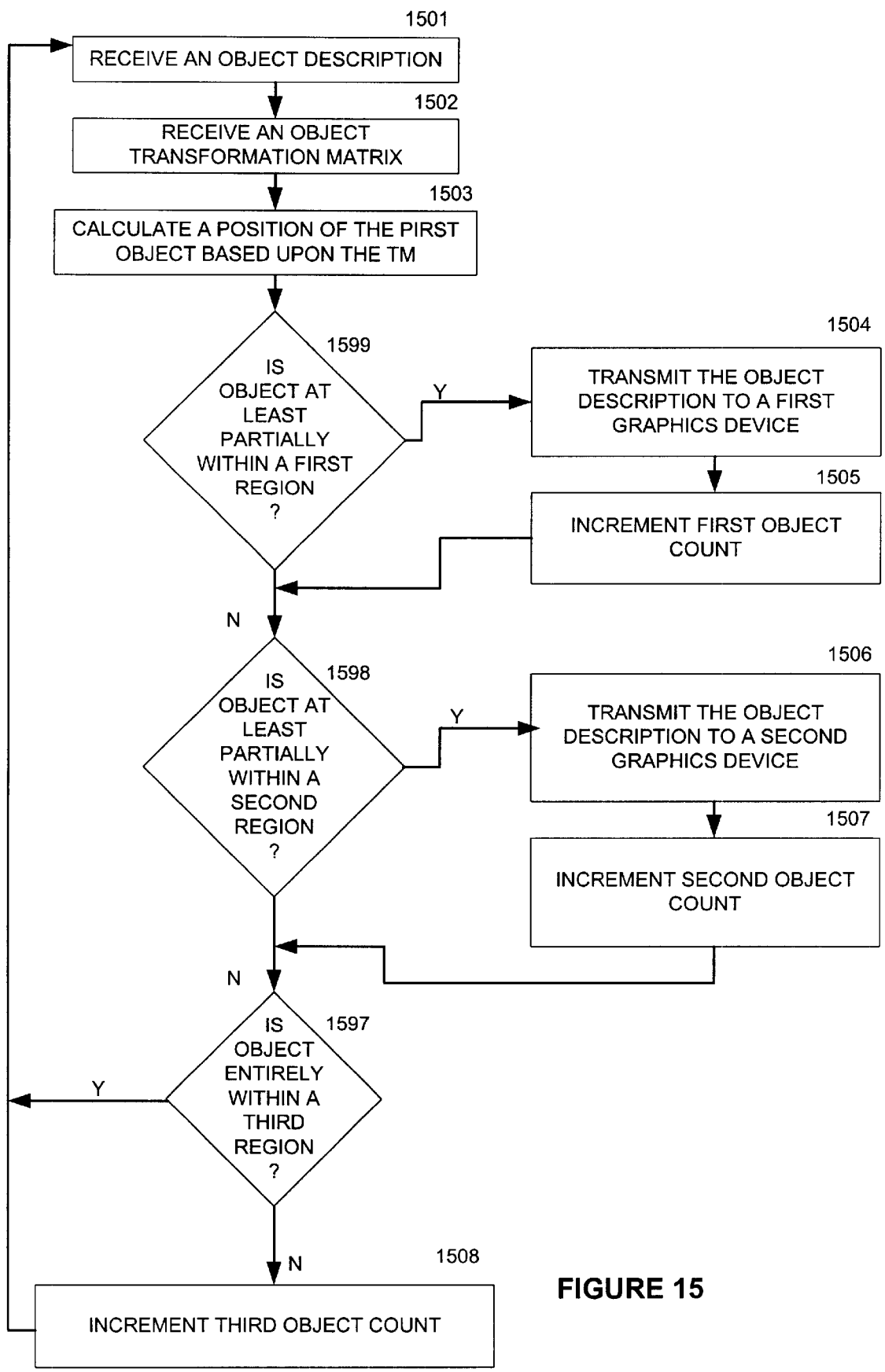
FIG. 15 illustrates, in flow diagram form, a method associated with the operation of the data bridge of FIG. 14.

In accordance with a specific embodiment of the present invention, it is desirable for the method of FIG. 15 to be executed in real-time with respect to the images being displayed. Therefore, the calculations of step 1503 will generally occur at a rate of greater than 40 million transformation matrix calculations per second. Such a rate allows for real-time routing of object descriptions. With respect to FIG. 14, the transformation engine 1430 can perform the calculations of step 1503. Furthermore, in another embodiment, the transformation engine can make the determinations of steps 1598 and 1599. For example, the transform engine 1430 can determine whether or not an object is in a specific region and provide an indicator over the connection 1461 to the router 1420.

The transformation engine 1430, and various steps of FIG. 15, may be implemented in hardware or software processing modules, or devices, such as a data processor, or a plurality of processing devices. Such data processors may be a microprocessor, microcontroller, microcomputer, digital signal processor, state machine, logic circuitry, and/or any device that manipulates digital information based on operational instruction, or in a predefined manner. Generally, the various functions and systems represented by block diagrams are readily implemented by one of ordinary skill in the art using one or more of the implementation techniques listed above.

When a data processor for issuing instructions is used, the instruction may be stored in memory 1450. Such a memory may be a single memory device or a plurality of memory devices. Such a memory device may be read-only memory device, random access memory device, magnetic tape memory, floppy disk memory, hard drive memory, external tape, and/or any device that stores digital information. Note that when the data processor implements one or more of its functions via a state machine or logic circuitry, the memory storing the corresponding instructions may be embedded within the circuitry comprising of a state machine and/or logic circuitry, or it may be unnecessary because the function is performed using combinational logic.

Figure 17:
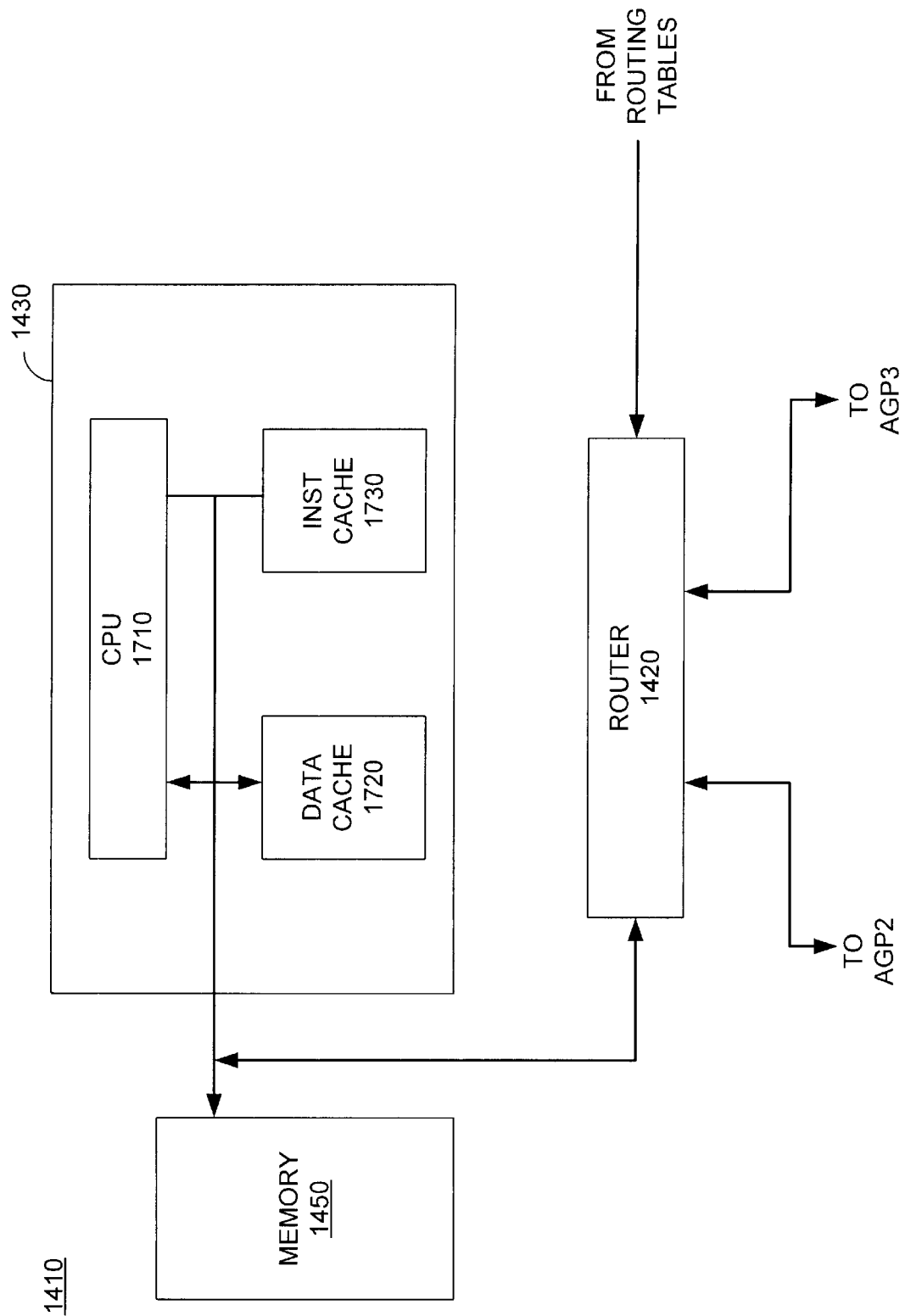
FIG. 17 illustrates, in block diagram form, a portion of the data bridge of FIG. 14 in greater detail.

FIG. 17 illustrates, in block diagram form, a portion of the data bridge 1410 in greater detail. Specifically, the transform engine 1430 is illustrated to include a central processing unit 1710, data cache 1720, and instruction cache 1730. Furthermore, the specific embodiment of FIG. 17 illustrates memory 1450 being a dual data rate memory that can store vertex values of the data descriptions and the router 1420.

In another embodiment of the present invention, instead of transmitting the object descriptions received during step 1501 at steps 1504 and 1506, a substitution can be made whereby the calculated projection coordinates are transmitted instead of the originally received object coordinates. Where such a substitution is made, the graphics processors can be off loaded from having to perform the transformation matrix calculation projection.

The FIGS. 14–17 have been used to describe a specific aspect of the present invention, whereby one of ordinary skill in the art will recognize that many alternative implementations can be made to the embodiments described without departing from the scope of the claimed invention. Specifically, performing a transformation matrix calculation on received graphics data at a data bridge device facilitates efficient routing of graphics data. Performing a transformation matrix calculation allows the data bridge to properly route data to only those graphics processors needing the data. As result, data bandwidth is not unnecessarily utilized.

Figure 18:
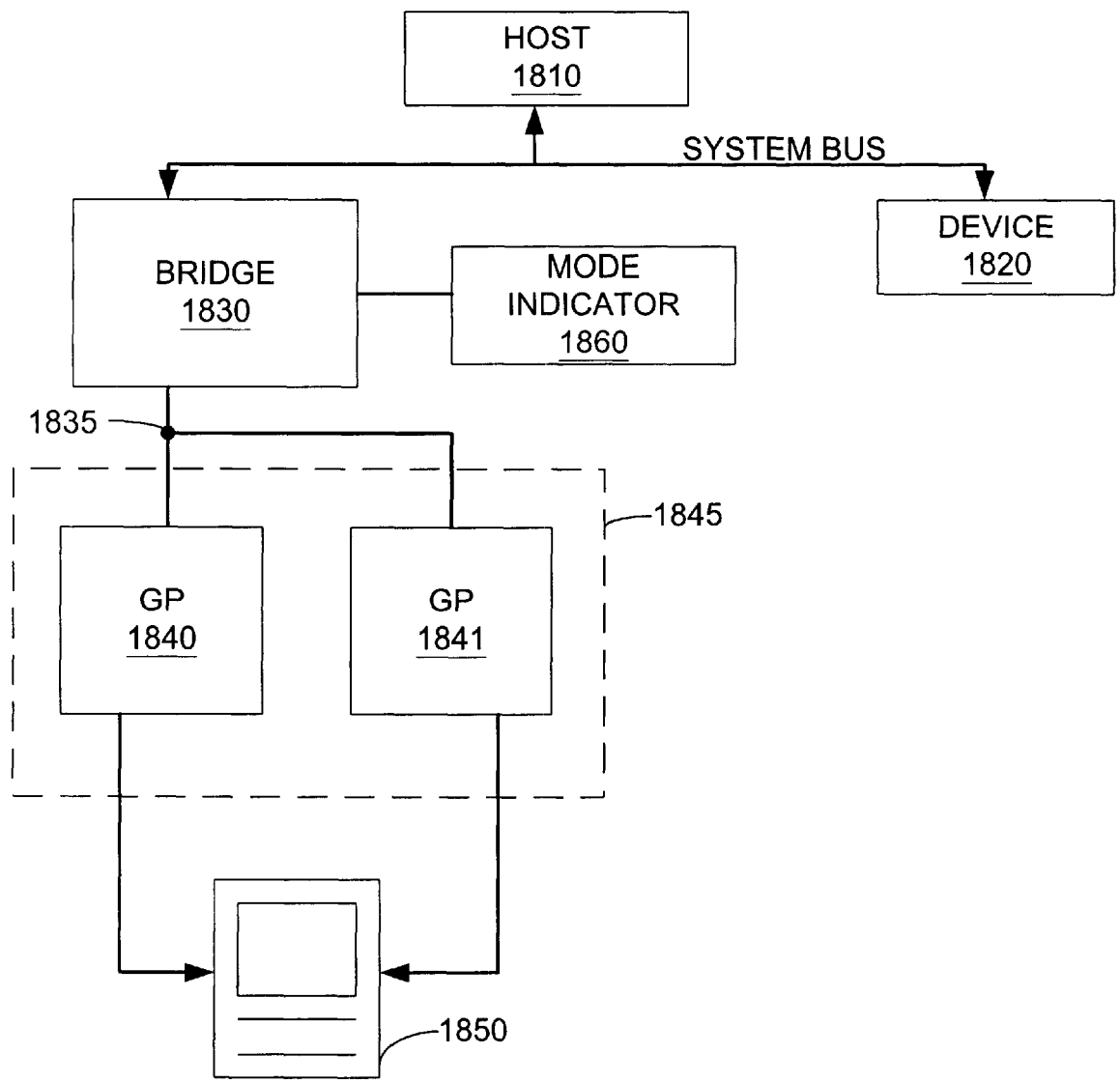
FIG. 18 illustrates, in block diagram form, a system in accordance with a specific embodiment of the present invention.

FIG. 18 illustrates a system implementing a specific embodiment present invention. FIG. 18 includes the host portion 1810, a bridge 1830, a mode indicator 1860, a device 1820, a first graphics processor 1840, a second graphics processor 1841, and a display device 1850.

The host 1810 is coupled to the bridge 1830 and device 1820 via a system bus. The term host is used to refer the portion of the system that is responsible for configuring devices on the system bus. The mode indicator 1860 is connected to bridge 1830. The first and second graphics processors 1840 and 1841 are connected to bridge 1830 via the bus 1835. The display device 1850 is coupled to graphics processors 1840 and 1841.

The system bus connected to the host 1810, the bridge 1830, and device 1820 can be any standard, or proprietary bus capable of supporting one or more devices. For example, the system bus can be a peripheral component interconnect (PCI) bus, or an accelerated graphics port (AGP) bus. Note, the presence of device 1820, or multiple devices, depends upon the specific system implementation. For example, the system bus can be an AGP bus connecting only the host and the bridge.

The bus 1835, connected to bridge 1830 and graphics processors 1840 and 1841, can be a shared bus, such as a PCI bus, or can represent separate buses, such as two separately controlled AGP buses as previously described herein.

The mode indicator 1860 can be hardware or firmware capable of indicating a specific mode of bridge 1830 operation during a reset condition sequence. Examples of hardware or firmware include non-volatile memory, straps, and/or other circuitry.

Examples of non-volatile memory include Read Only Memory (ROM), Electrically Erasable Read Only Memory (EEPROM), Erasable Read Only Memory (EPROM), and FLASH memories. In addition, one of ordinary skill in the art will recognize that other variations of nonvolatile memory can be used.

Examples of straps include hard-wiring and/or using jumpers on external pins to a specific voltage reference node. Examples of other external circuitry include circuitry that provides a specific voltage reference value to an external pin during a start-up, or reset condition.

Because the mode indicator is queried prior to the bridge device 1830 being configured, in a preferred embodiment the mode indicator 1860 needs to be independent of the host 1810.

Figure 19:
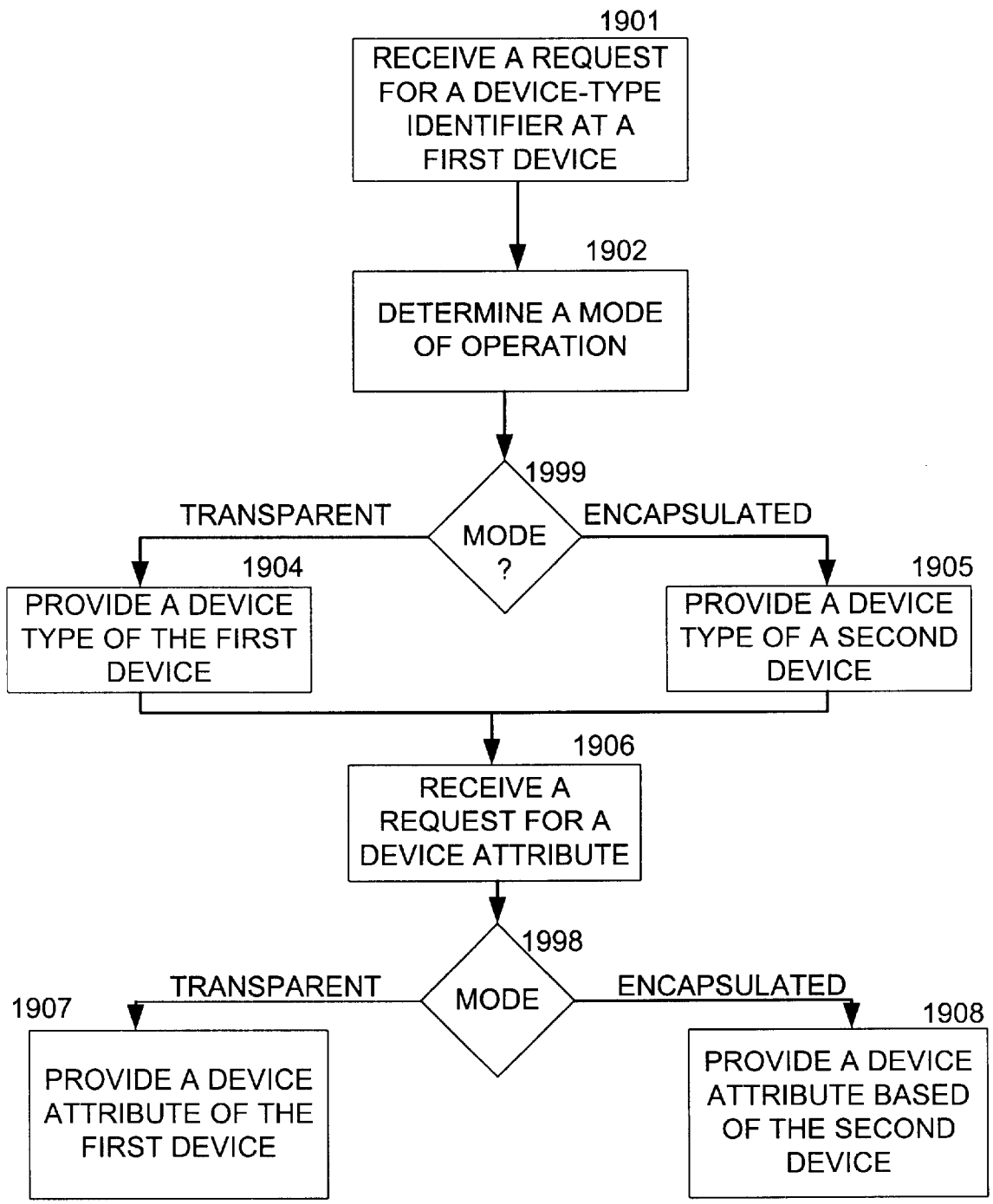
FIGS. 19–21 illustrate, in flow diagram form, a method in accordance with a specific embodiment of the present invention.

The operation of the system illustrated in FIG. 18 is described with reference to the method of FIG. 19.

At step 1901, the bridge 1830 receives a request for a device type identifier. In operation, such a request occurs during a configuration routine that is the result of a power-up reset, or other hardware and/or software reset condition. Referring to FIG. 18, this request is one of plurality of requests that can be made by the host 1810 during a configuration routine.

For example, the host 1810 uses an arbitration protocol specific to the system bus to determine which devices are connected to the system bus. The specific protocol allows a specific device to be selected and queried for other device specific information. The device specific information, referred to as attributes, can include device type information, vendor identifier information, device identifier information, memory aperture information, and I/O aperture information, as well as other device specific information.

In accordance with a specific embodiment of the invention, the response of the bridge 1830 to the request of step 1901 will vary depending upon a specific mode of operation. At step 1902 a determination as to the specific mode of operation is made.

With respect to FIG. 18, the specific mode of operation is determined using the mode indicator 1860. In one embodiment, the mode indicator can be a strap connected to a specific voltage level. For example, when a strap is connected to a ground terminal, a first mode of operation is indicated, and when the strap is connected to a power terminal, a second mode of operation is indicated. In another embodiment, the bridge 1830 accesses a ROM device to determine its current mode of operation. Because the method of FIG. 19 is performed during a configuration routine, the bridge 1830 does not have access to software drivers that are executed on the host 1810.

At step 1999 a flow decision is made based upon the mode of operation. When the mode of operation is a first mode, indicating a transparent bridge mode, the flow proceeds to step 1904. When the mode of operation is a second mode, indicating an encapsulated bridge mode, the flow proceeds to step 1905.

At step 1904 the mode of operation is a transparent bridge mode of operation, whereby the bridge 1830 will provide its own device type to the requesting device, thereby indicating that it is a bridge. Attribute information, such as device type, is stored in configuration memory associated with each device connected to the system bus. Therefore, the bridge 1830 will retrieve its device type identifier from configuration memory and provide it to the requesting device when the mode is transparent bridge mode. From step 1904 the flow proceeds to step 1906.

At step 1905 the mode of operation is an encapsulated bridge mode of operation, whereby the bridge 1830 provides a device type other than its own device type to the requesting device. For example, in a specific mode of operation, it is desirable for the host 1810 to treat the first and second graphics processors 1840 and 1841 as a single graphics processor 1845. Therefore, upon receiving a device type identifier request, the bridge 1830 will provide a device type back consistent with the device type of the graphics processors 1840 and 1841, and not its own device type. For example, the bridge 1830 will provide a device type to the host indicating that it is graphics processor. As a result, any subsequent accesses by the host to the bridge 1830 are made by the host with the belief that the bridge 1830 is actually a graphics processor. In effect, the true identity of the bridge 1830 is hidden to the host, and a single encapsulated identity has been provided to the host 1810 for the combination bridge 1830 and graphics processors 1840 and 1841. The flow proceeds to step 1906.

At step 1906, the bridge 1830 receives a request for another specific device attribute. For example, a vendor identifier, device identifier, or other aperture information can be requested. The bridge 1830 will return an identifier based on one or more of the graphics processors 1840 and 1841 in response to the request. For example, the bridge can return a predefined, or calculated, aperture information when the request is for aperture information. For example, during configuration the device needs to provide an indication of memory space to be allocated for its operation for a memory aperture request. Therefore, the bridge 1830 in its response for memory aperture information needs to take into account the memory requirements of both the graphics processors 1840 and 1841.

The specific embodiment of the present invention described is advantageous over the prior art. For example, the host 1810 can recognize the "bridge group", which includes bridge 1830, graphics processor 1840, and graphics processor 1841, as a single graphics processor instead of its three separate devices. Therefore, the configuration resources required by the host 1810 are reduced. Furthermore, because the bridge group appears to be a single graphics processor to the host 1810, the host 1810 does not need to spend computational bandwidth determining where to route specific graphics data. In addition, applications that require a single graphics device will operate properly on the multiprocessor implementation described herein. Therefore, the CPU bandwidth resources required by the host 1810 are reduced.

Figure 20:
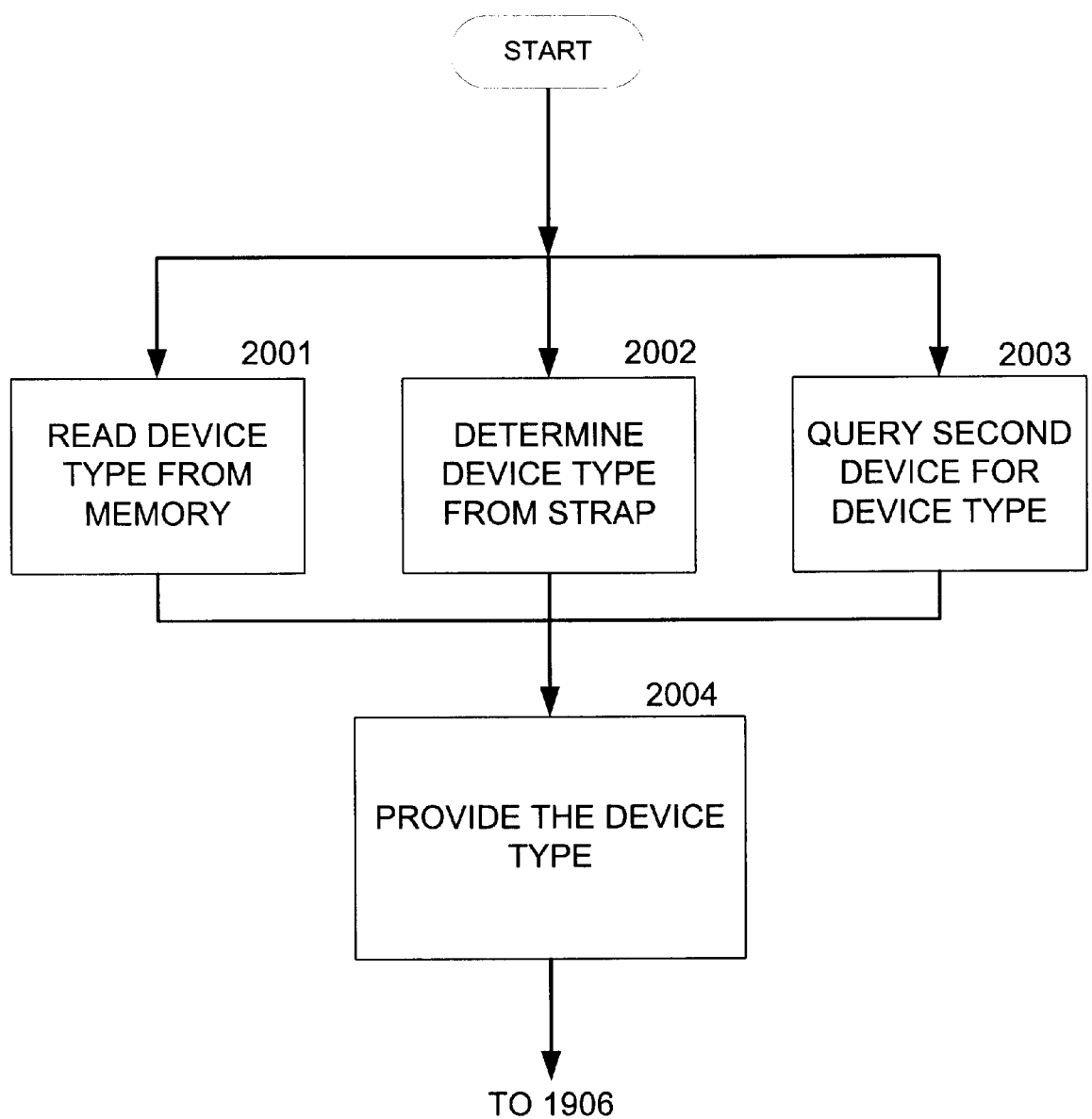

FIG. 20 illustrates specific substeps which are associated with a specific embodiment of step 1905. Specifically, step 1905 provides specific device type information to the requested device. In accordance with a specific embodiment of FIG. 20, the function of step 1905 can be achieved through one or more steps.

A first option, at step 2002, for determining what device type to return, includes having the device type stored in a memory associated with the bridge 1830. For example, the device type of the underlying graphics processors 1840 and 1841 can be stored in a ROM accessible by the bridge 1830 during configuration. In this manner, during encapsulated mode of operation, the bridge 1830 would access the device type stored in the ROM and provide this value to the request device.

A second option, at step 2001, for determining the device type to be returned at step 1904 includes choosing the device type based upon an external indicator, such as a strap. For example, in one embodiment, it would be predefined that when the system of FIG. 18 is in the first mode of operation, based on a strap, that one of a plurality of device types would be returned. For example, if three pins associated with the bridge 1830 can be strapped to indicate a specific device type, one of up to 8 stored device type values would be returned to the requested device based upon the strap supplied.

A third option, step 2003, for determining what device type to return includes querying a second device for its device type. Referring to FIG. 18, the bridge 1830 would query one of the graphics processors 1840 or 1841 for their device type.

At step 2004, the obtained device type is provided to the requesting device.

Figure 21:
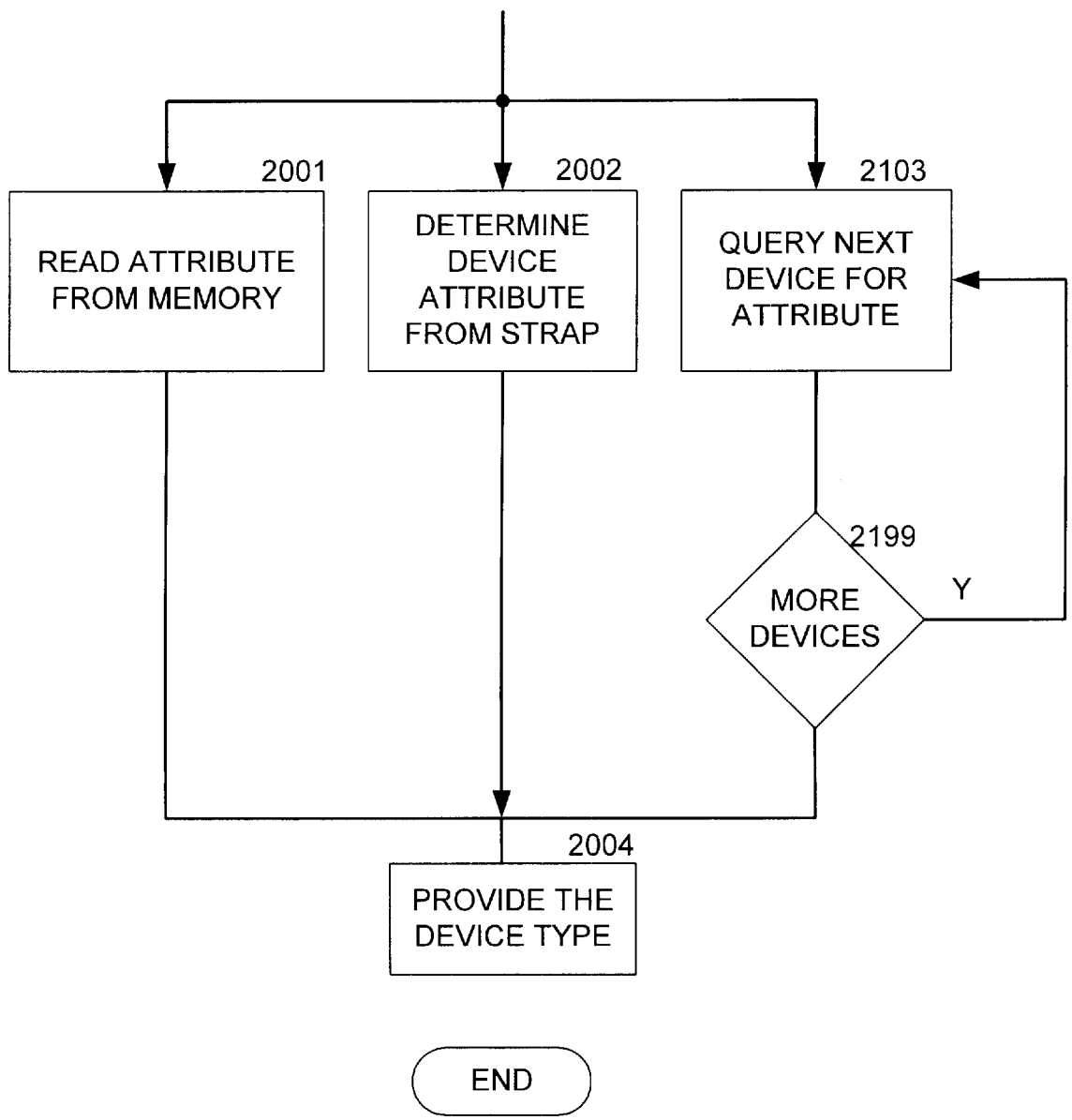

The method of FIG. 21 is similar to the method of FIG. 20. However, instead of the bridge querying a single attached device, the bridge in accordance with the method of FIG. 20 can query multiple devices. Specifically, steps 2103 and 2199 query each device attached the bridge 1830 for their attributes.

Figure 22:
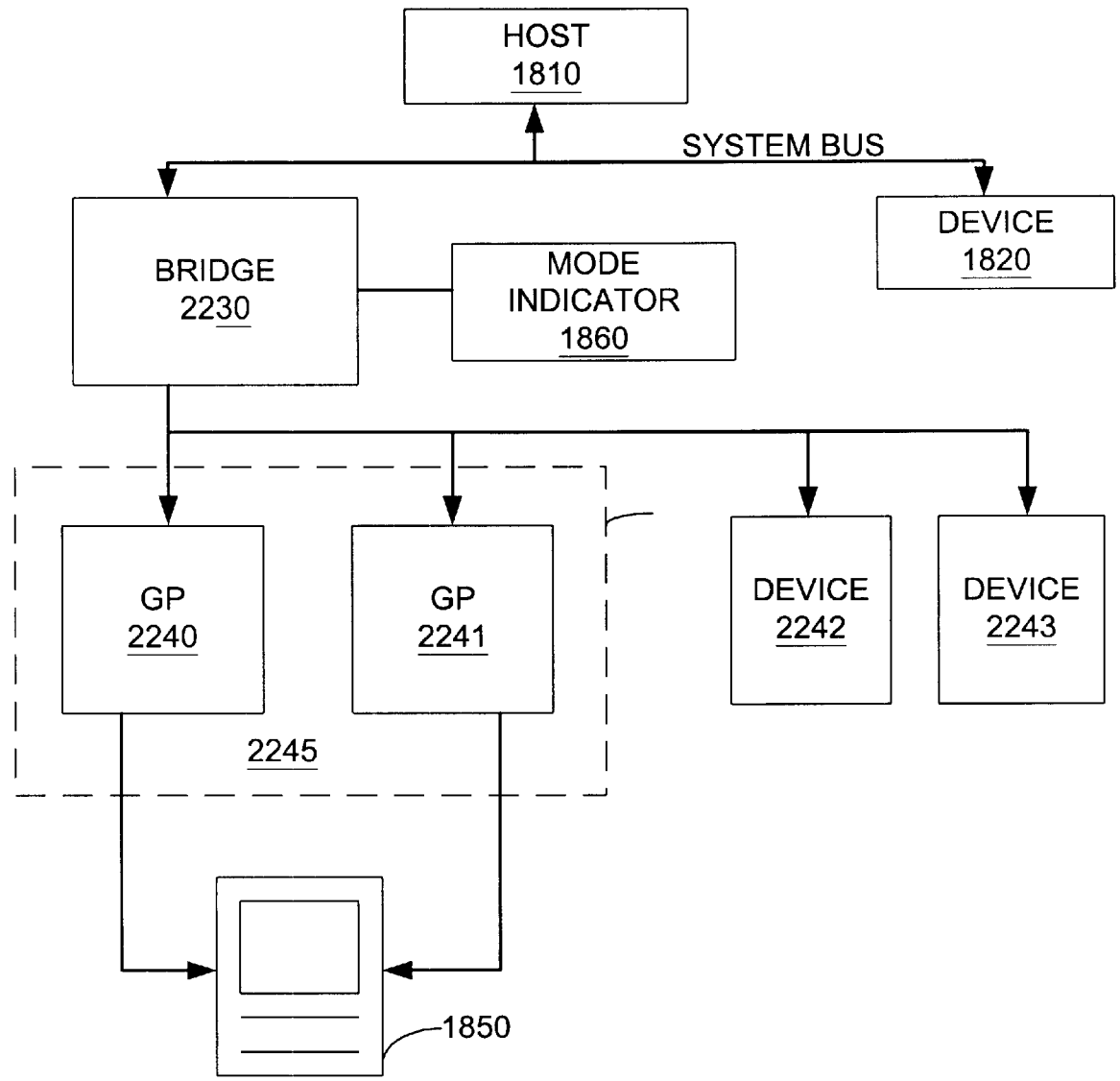
FIG. 22 illustrates, in block diagram form, an alternate embodiment of a system in accordance with the present invention.
Figure 23:
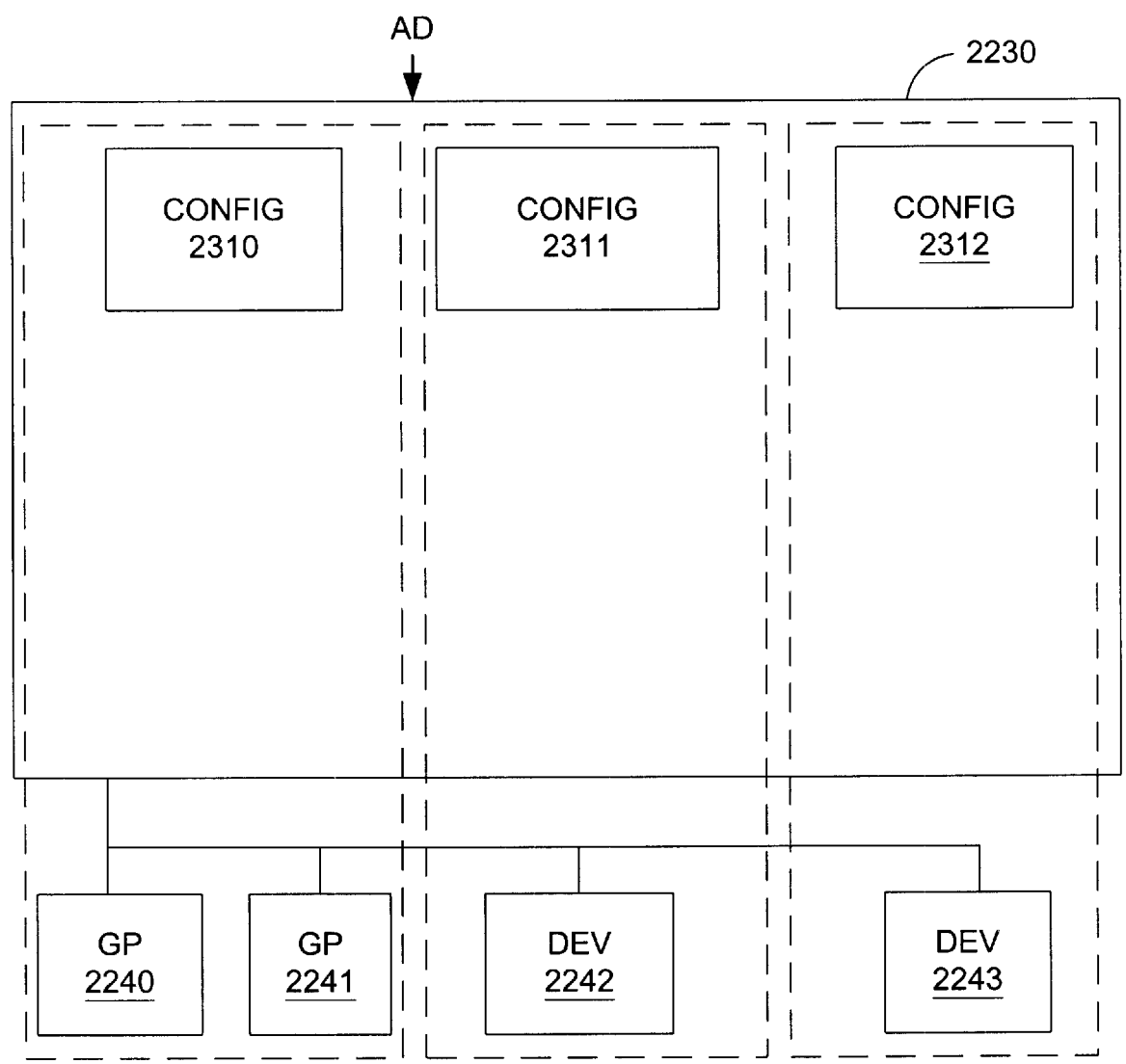
FIG. 23 illustrates, in block diagram form, a specific embodiment of the system of FIG. 22 in greater detail.
Figure 24:
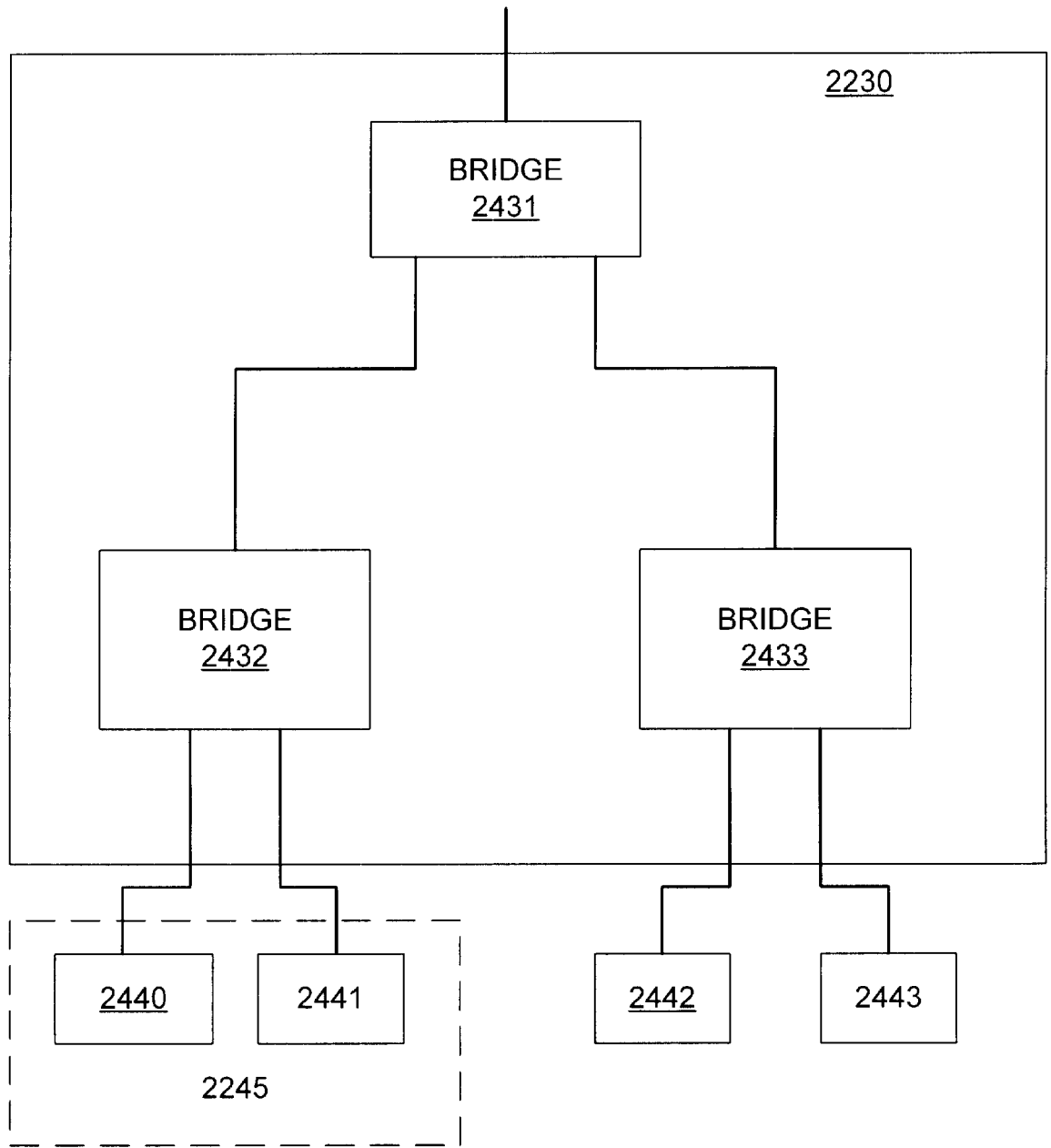
FIG. 24 illustrates, in block diagram form, a specific embodiment of the system of FIG. 22 in greater detail.

FIG. 22 illustrates a bridge 2230 having four underlying devices 2240–2243. As illustrated, devices 2240 and 2241 are graphics processor devices to be encapsulated from the perspective of the requested device (as indicated by the box 2245). Devices 2242 and 2243 are other devices accessible to the bridge 2230. During the configuration routine, the method of claim 21 queries each of the devices 2240–2243 for their device types. Based upon the retrieved information, the bridge 2230 can make an intelligent decision on how to respond to the host device 1810. FIGS. 23–24 illustrated two specific embodiments.

FIG. 23 illustrates a specific implementation of bridge 2230 having multiple configuration registers. Having multiple configuration registers allows the bridge 2230 to "trick" the host 1810 into believing it is seeing the three separate devices. For example, when the system bus is an AGP bus, the bridge 2230 can be designed to respond to a plurality of configuration enables on the AD (address/data) portion of the bus during configuration. For example, for a first AD bit being asserted during configuration, the bridge 2230 can respond with information stored in the configuration register 2310, which describes the desired configuration the graphics processors 2240 and 2241. When a second AD bit is asserted during configuration, the bridge 2230 will respond with information stored in the configuration register 2311, which describes the desired configuration of the device 2242. When a third AD bit is asserted during configuration, the bridge 2230 will respond with information stored in configuration register 2312, which describes the desired configuration of the device 2243.

By responding to three different configuration opportunities, the host 1810 will allocate the resources necessary in the system maps to direct accesses associated with any of the devices 2240–2243 to the bridge 2230. In response, the bridge 2230 will be responsible for providing access requests to the appropriate underlying device 2240–2243.

In another embodiment of FIG. 22, the bridge 2230 can identify itself as a multi-function device. As a multi-function device the bridge can report that it has 2 functions, for example, a bridge function and a graphics processor function, two bridges functions, or two graphics functions. In accordance with the present invention, the underlying function, or device(s), can respond to attribute requests in accordance with the present invention.

FIG. 24 illustrates another specific embodiment of bridge 2230 having multiple bridge devices 2431–2433. Each of the individual bridge devices 2431–2433 operate according to the description provided for bridge 1830 of FIG. 18. Specifically, the mode indicator of the top-level bridge 2431 will indicate that the bridge 2431 is operating as a bridge. Therefore, in response to a device type request, the bridge 2431 will identify itself as a bridge.

Subsequent to the bridge 2431 be identified as a bridge, the requested device will request configuration information for devices connected to the bridge 2431. When bridge 2432 receives its request it will provide a device type identifier identify itself as a graphics processor, instead of a bridge, based upon its mode indicator. Therefore, to the system host will recognize the graphics processors 2440 and 2441 as a single graphics processor.

The bridge 2433, will identify itself as bridge in response to receiving a configuration request. As a result, the configuring device subsequently requests device type identifiers from the devices 2242 and 2243. For a specific embodiment, the devices 2242 and 2243 will provide back to configuring device, through bridge 2433 and bridge 2431, their respective device types. The resulting configuration allows for the graphics processors 2240 and 2241 be treated as a single graphics processor by the host, while the devices 2242 and 2243 are recognized as individual devices by the host as well.

Referring back to FIG. 21, steps 2103 and 2199, which query for device attributes, can also query each of the devices for memory aperture attributes, or I/O aperture attributes. For example, referring to FIG. 18, upon receiving a memory aperture request, the bridge 1830 can query each of the graphics processors 1840 and 1841 for their memory aperture information. By adding up the memory aperture requirements of the multiple devices that are encapsulated, a single memory aperture response can be made to the host 1810 cover the requirements of multiple devices. For example, if each of the graphics processors 1840 and 1841 have a memory aperture size of 16 MB, the bridge 1830 would provide to aperture value 32 MB to the host 1810, thereby providing support for both graphics processors 1840 and 1841.

In addition to being able to route data from one port to another, as described previously, another embodiment of the present invention, illustrated in FIGS. 26–33, supports translating an AGP protocol access or PCI access of a first type to an AGP protocol access or PCI access of a second type.

An AGP protocol access is defined herein to be any access type supported by the AGP protocol. Specific AGP protocol access types include AGP master accesses which initiate data access, and AGP target/slave accesses which receive access requests.

An AGP mastered access is a transfer initiated by a specific device. Examples of AGP mastered transfers include the following AGP protocol access types: AGP master write, AGP master read, AGP master fast write, PCI master write, and PCI master read. Note that PCI transfers are included since the AGP specification is a superset of the PCI specification. Examples of AGP target/slave transfers include the following AGP protocol access types: AGP write target, AGP target read, AGP target fast write, PCI slave write, and PCI slave read. Note that the term slave is used with reference to PCI accesses and the term target is used with reference to AGP transfers.

In one embodiment, each device connected to a bridge, such as the devices connected to the bridge 110 of FIG. 1, will support all AGP protocol transfers. In another embodiment, devices can support subsets of the full AGP protocol. For example, some graphics controllers do not support AGP write accesses (mastered or targeted), nor AGP fast write accesses (mastered or targeted), in an effort to simplify their design.

Since the bridge devices connect a variety of devices together, it is usually necessary to limit access requests to a bridge to the bus protocol of the lowest common denominator. For example, device X supports all AGP protocol access types. Device Y supports only PCI accesses and AGP master type accesses. Therefore, it is not possible for device Y to retrieve data from device X by an AGP master write access, since device Y does not support AGP write target type accesses. Instead, the device X would need to access the device Y using a PCI write type access, which is supported by the device Y. This lowest common denominator situation results in slow access rates at each device.

In accordance with a specific embodiment of the present invention, the bridge is capable of translating APG protocol accesses of a first type to AGP protocol accesses of a second type.

Figure 26:
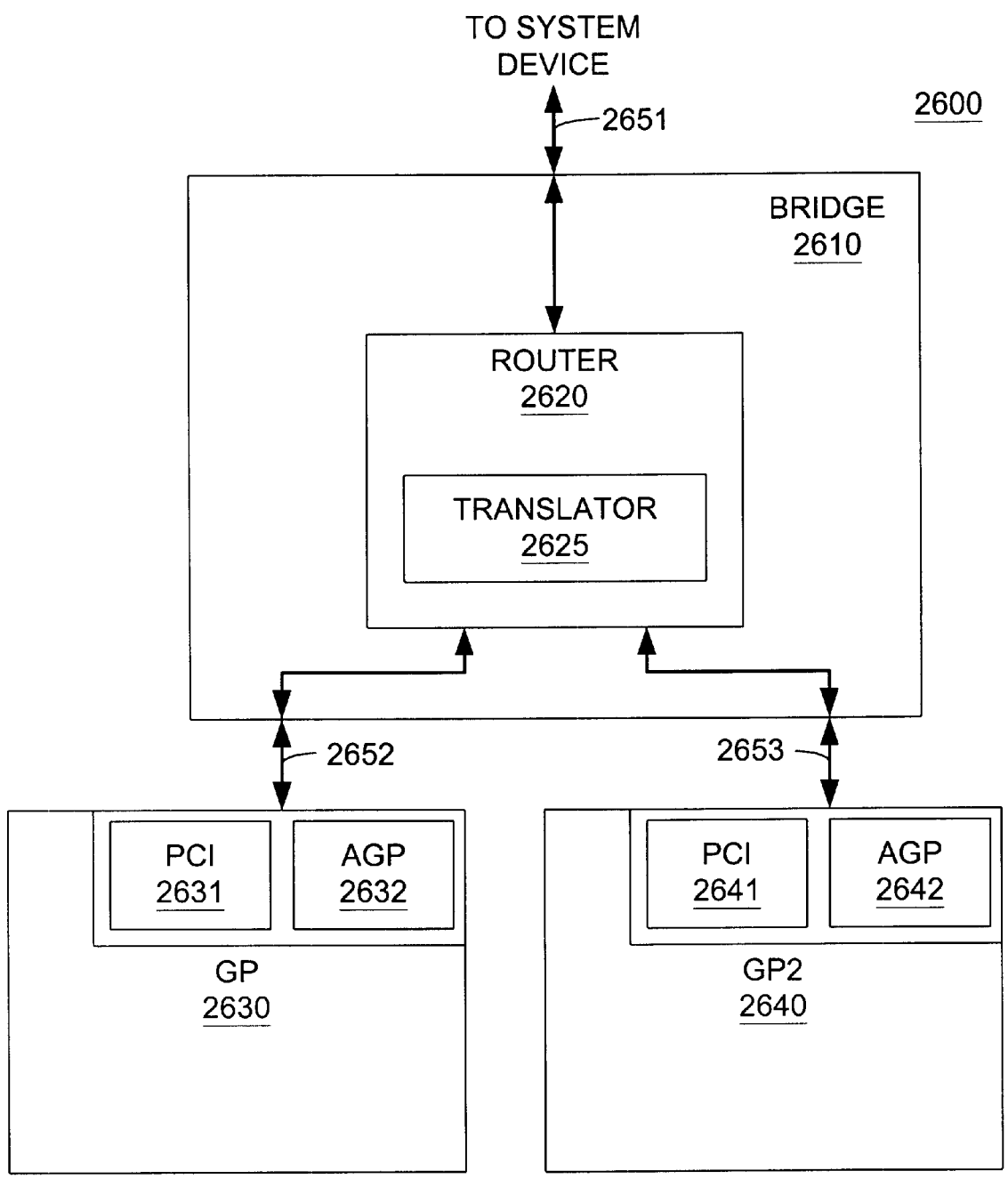
FIG. 26 illustrates, in block diagram form, a system 2600 in accordance with a specific embodiment of the present invention.
Figure 27:
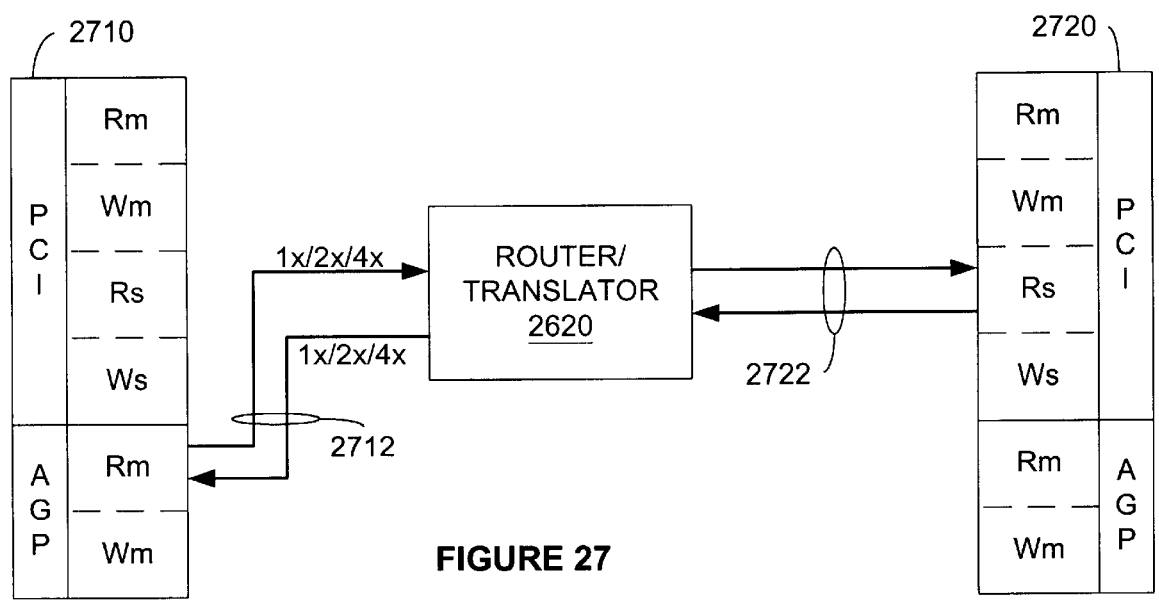
FIGS. 27, and 29–31 illustrate, in block diagram form, a portion of the system of FIG. 26 providing an interface between two buses.

FIG. 26 illustrates a system 2600 in accordance with the present invention. The system 2600 includes a bridge 2610 having a router 2620, which in turn includes a translator 2625. The system 2600 further includes a first graphics processor 2630 having a PCI port 2631 and an AGP 2632 and a second graphics processor 2640 with a PCI port 2641 and an AGP 2642. The bridge 2610 has a first port connected to a system device (not shown) over bus 2651, a second port connected to a first graphics processor 2630 over bus 2652, and a third port connected to the second graphics processor 2640 over a bus 2653.

In operation, the bridge 2610 supports the routing of access requests from a first port to a second port. Such transfers can be of a conventional type, non-translated, or of one of the types described herein. The bridge also supports translating accesses from one AGP protocol access type to a second AGP protocol access type. For example, referring to FIG. 27, bus control portions 2710, and 2720, associated with first and second bus controllers respectively via bus 2712 and 2722, are capable of generating AGP read accesses. However, they are not are capable of receiving AGP read accesses. Therefore, the bus control portion 2710 cannot access the bus control portion 2720 directly using an AGP read master access. However, in accordance with a specific embodiment of the invention, an AGP read access from portion 2710 will be translated to a PCI read access by the translation portion, which can be processed by the PCI read slave portion of the memory control portion 2720.

This is an advantage over previous bridge devices that do not support translating AGP protocol accesses from on type to another type. Specifically, this is advantageous because it allows each bus to operate at its full transfer rate, thereby improving bandwidth.

Specific implementations of control logic for supporting the full AGP protocol specification are well-known. Therefore, the translator portion 2620 can be readily implemented by one of ordinary skill in the art to receive data access requests at a first port for a first AGP protocol access type, and translate the request to a second AGP protocol access type at a second port. For purposes of description, the translator portion 2620 is considered to have discrete portions for performing various translations, for example, an AGP write access to a PCI write process portion. However, it will be appreciated that generally, transition logic will include shared logic portions.

It will be appreciated by one of ordinary skill in the art, that when the translation is between accesses of varying data rates, that it would be desirable for the translator 2620 to buffer the data. In other embodiments, all transfers can be buffered. In yet another embodiment, no buffering would be used for some transfer types.

Figure 28:
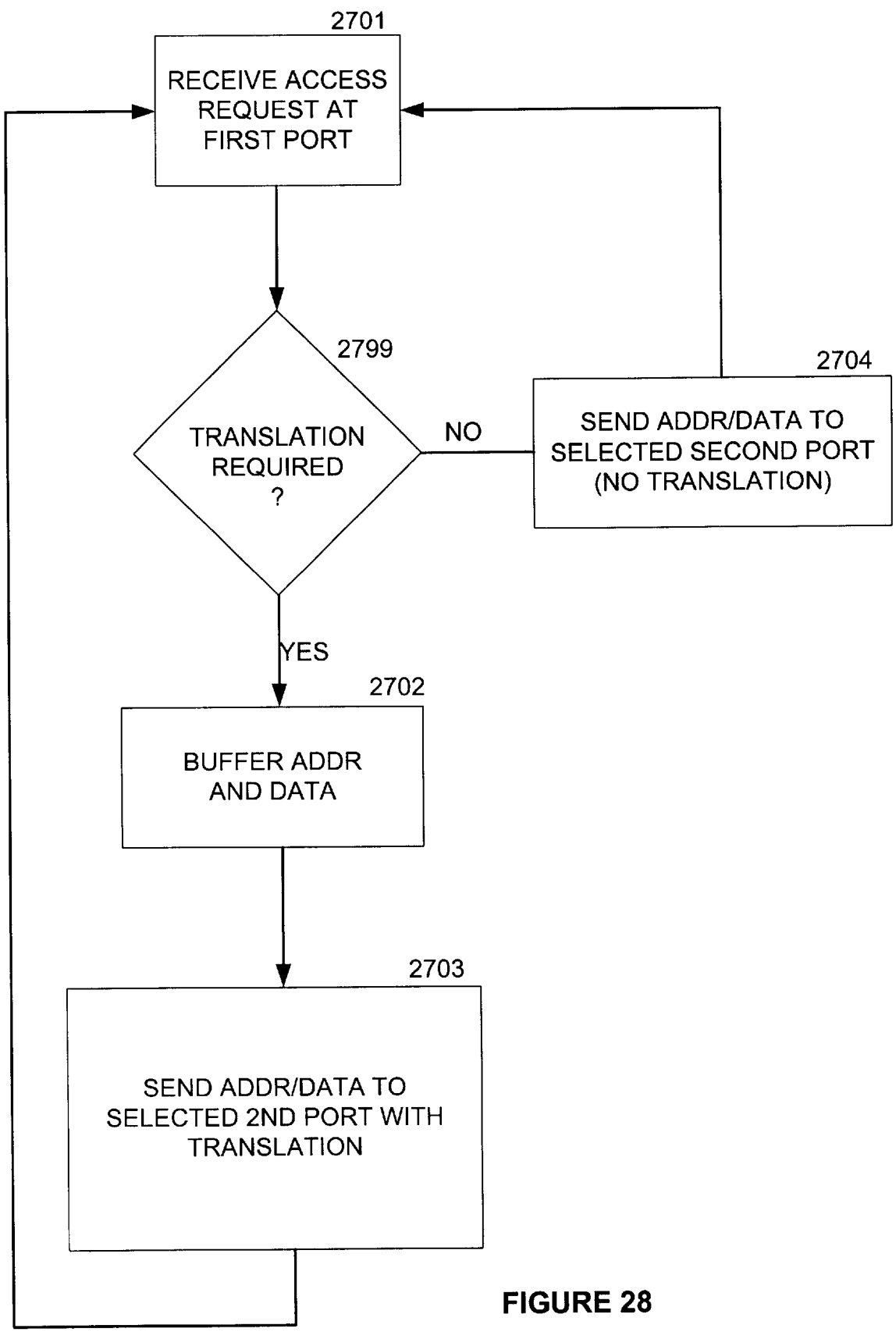
FIG. 28 illustrates, in flow diagram form, a method in accordance with present invention.

FIG. 28 illustrates a method in accordance with the present invention. At step 2701 an access request is received at a first port. Next, at step 2799 a determination is made as to whether or not a translation is required between devices. If no translation is required, the flow proceeds to step 2704 where the access request is transmitted on a second port using the same protocol. From step 2704, the flow proceeds to step 2701 to receive a second request. From step 2799, the flow proceeds to step 2702 if a translation is required.

At step 2702, the address and data information associated with the transfer are buffered. Note that in another embodiment, step 2702 is optional, as it may not be necessary to buffer the address and data. For example, the method of FIG. 28 can be a pipelined method, whereby steps overlap with the steps of the next and/or previous access. However, buffering will generally be used when a translation results in a change of transfer rates.

At step 2703, the address and data information is transferred to the second port to be transmitted to the receiving device in an AGP protocol access type supported by device.

Figure 29:
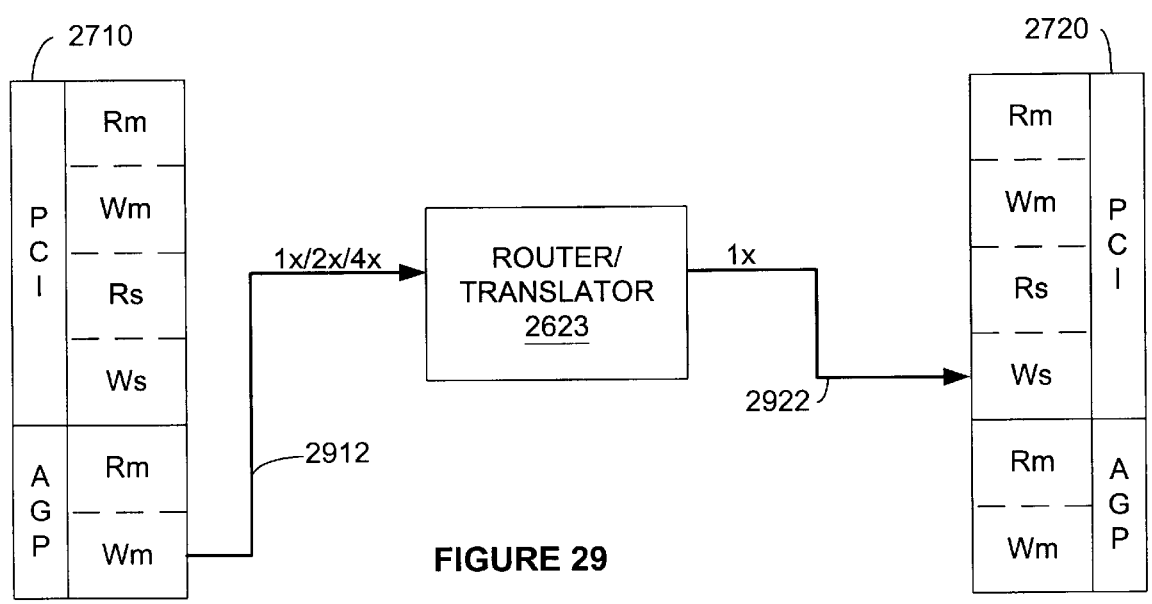
Figure 30:
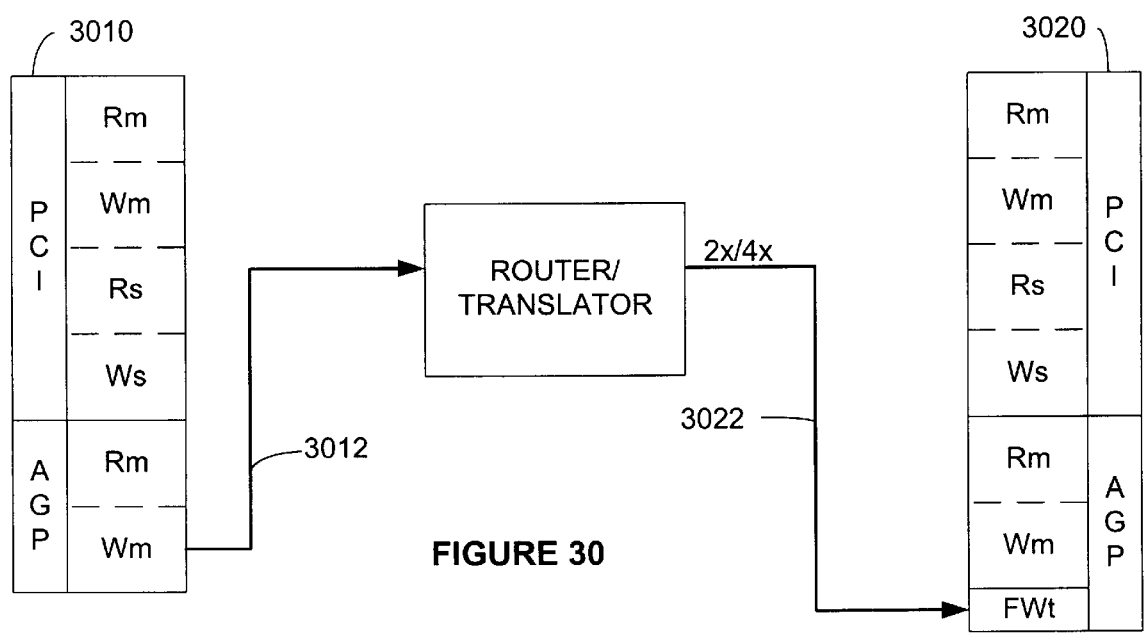
Figure 31:
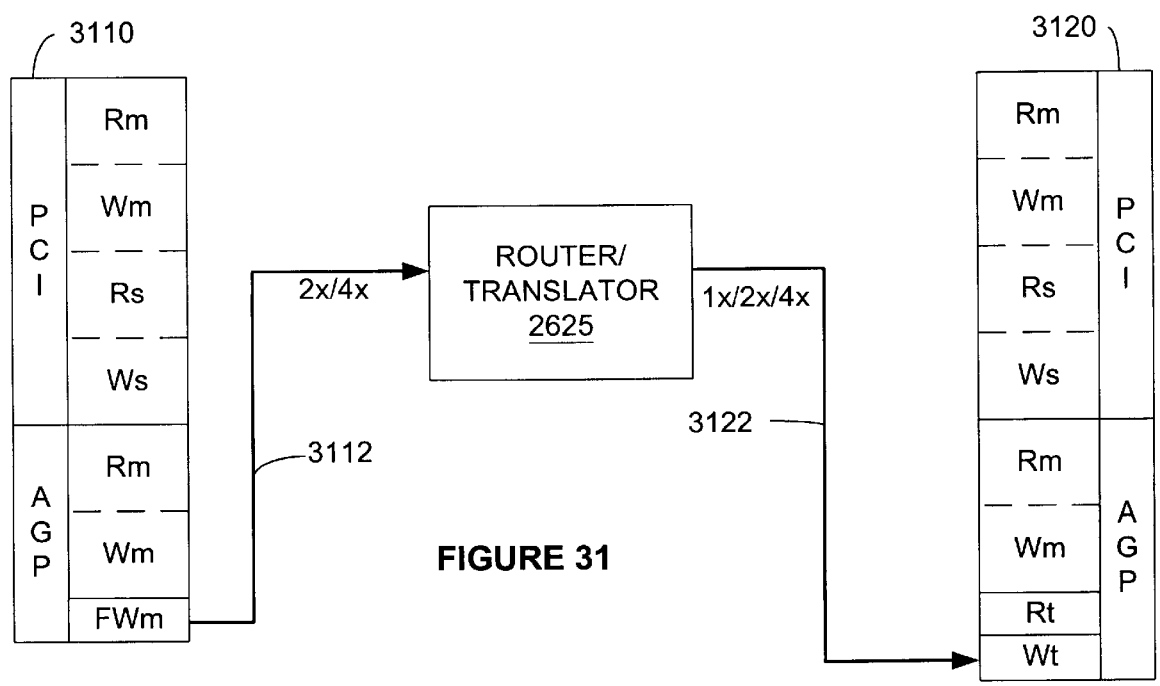

FIGS. 29–31 illustrate other examples of specific translations from one AGP protocol access type to another. Specifically, FIG. 29 illustrates a translation from an AGP master write access into a PCI master write request access from bus control portion 2710 to bus control portion 2720 through the router/translator 2623 via bus 2912 and 2922. FIG. 30 illustrates a translation from an AGP master fast write access into an AGP master write access. One of ordinary skill in the art will recognize that other translations are also possible.

Figure 32:
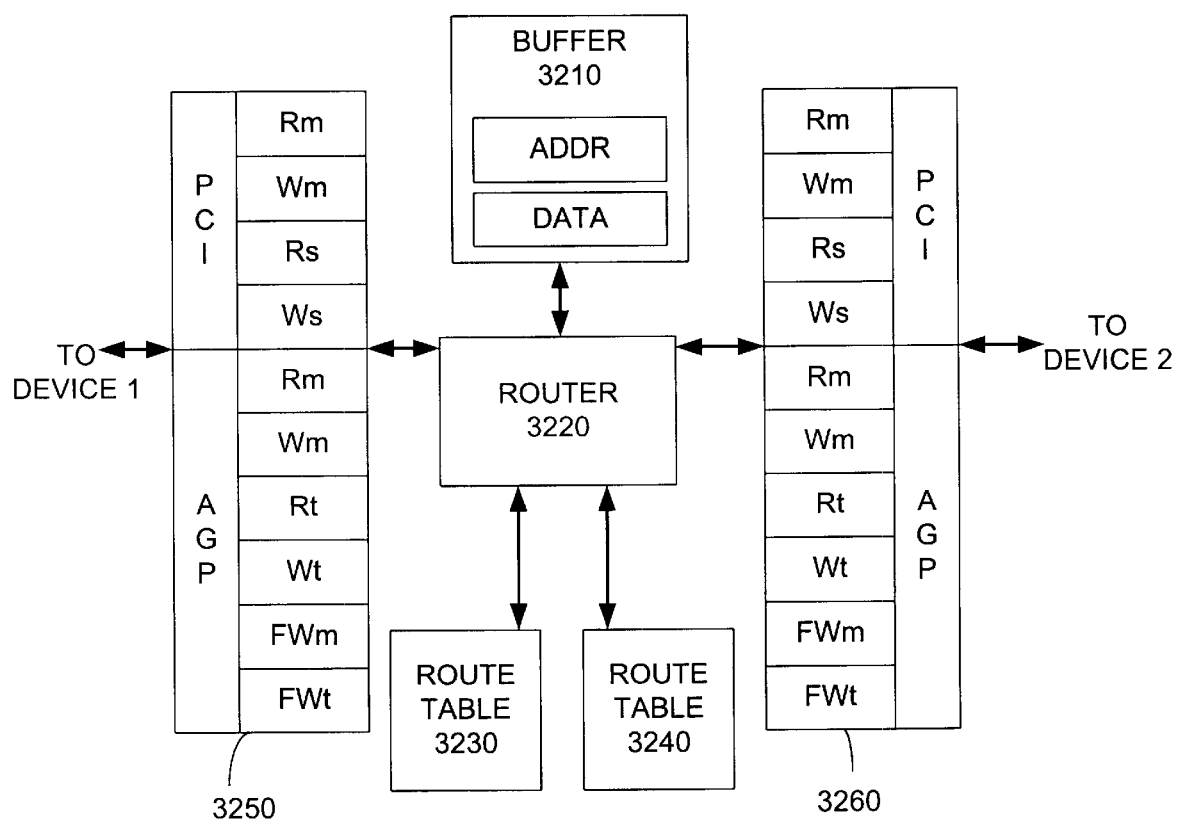
FIG. 32 illustrates, in block diagram form, a system portion of the system of FIG. 26 in greater detail.

FIG. 32 illustrates a portion of the system of FIG. 26 in greater detail. The specific implementation illustrates the router/translator 2610 further connected to the buffer 3210, the route table 3250, and the translation table 3240. In operation, the buffer 3210 is used to buffer address and data received from one device prior to being transmitted to a second device. One of ordinary skill in the art will recognize that the buffer 3210 can also reside between the router 3220 and the respective of control portions 3250 and 3260.

The route table 3230 operates in the manner previously described to determine between which ports specific data accesses are to be routed. The translation table 3240 specifies whether a translation is to occur. This is better illustrated with reference to FIG. 33.

FIG. 33 illustrates a portion of translation table 3240 for one port. In a specific embodiment, the translation table lists in the first column all possible AGP access types. The second column lists the supported access to be used for the specific AGP protocol access type of column 1. For example, row 1 indicates that for the port associated with the table (i.e. port 1) an AGP read request for data from the device attached to port 1, must first be converted in to a PCI read request. Row 4 indicates that a PCI read request for data from the device attached to port 1 does not need to be converted, as indicated by the PCI read request indicator in column 2. One of ordinary skill in the art will recognize that other table, or register formats can be used to indicate appropriate translation information.

It should now be apparent that the specific aspects of the present invention described in FIGS. 26–33 are advantageous over the prior art. For example, using a translator within a bridge to convert between specific AGP protocol access types allows for improved data bus bandwidth, as opposed to the prior art, which transferred data at a lowest common bus protocol. Furthermore, utilizing a bridge as described herein allows devices that only implement a portion of a specification to be integrated into systems that implement more or fewer portions of the protocol, without having to redesign existing devices.

The FIGS. 26–33 have been used to describe a specific aspect of the present invention, whereby one of ordinary skill in the art will appreciate that the present invention has been described in terms of specific embodiments, and that variations may exist without departing from the scope of the invention. For example, translations from one AGP protocol access type to a second AGP protocol access type have been described as being performed by various portions that perform a specific translation. One skilled in the art will recognize that such portion need not be stand alone portions, but may actually be integrated with other portions to allow for the reuse of common resources.

Generally, each of the multiple AGP devices described previously herein have been connected to separate AGP channels of a bridge. This is consistent with the AGP protocol which specifies a master/target point-to-point connection. Point to point means that active communication can only occur between two AGP devices that reside on an AGP interface, where one device is a target and the second device is a master. However, in accordance with another aspect of the disclosed invention, an AGP bridge that allows access by multiple AGP masters devices through a single channel is disclosed. This is illustrated in FIG. 34.

FIG. 34 illustrates a system 3400 including a bridge device 3410, and devices 3460 and 3470. Device 3460 has an AGP port which is connected to the bridge 3410 through nodes 3440. Device 3470 has an AGP port which is connected to the bridge 3410 through nodes 3450 within bus portion 3430.

Bridge device 3410 includes a single device AGP channel 3412, a router 3416, and a multi-device AGP channel 3414. The router 3416 is connected to the single device AGP channel 3412 and to the multi-device AGP channel 3414.

In operation, the single device AGP channel 3412 controls bridge access to one of two devices in a point-to-point configuration. The multi-device AGP channel 3414 controls bridge access to multiple devices, such as graphics processors, using AGP protocol.

The multi-device AGP channel 3414 includes a master control portion 3420, and device controls 3422 and 3423. In operation, the master control portion 3420 controls those AGP nodes that are connected to each of the multiple devices, and arbitrates control between individual device controls 3422 and 3423. The individual device controls 3422 and 3423 control AGP nodes that are uniquely connected to only one device.

In a specific embodiment, each device of the multiple devices controlled by the channel 3414 receives its own arbitration signals, which include side band address bus (SBA), request, grant, read buffer full, and write buffer full signals. These arbitration control signals are illustrated as bus portions 3432 and 3433 for devices 3460 and 3470 respectively.

By supporting a multi-device AGP channel, pin count of the bridge device can be reduced. For example, a typical AGP channel supports a set of primary nodes to provide point-to-point AGP accesses in accordance with the prior art. In accordance with the specific embodiment of the present invention, a multi-device channel uses the primary set of nodes plus an auxiliary set of nodes. As illustrated, the auxiliary set of nodes requires 12 additional pins from the channel 3414—eight SBA pins, a request pin, a grant pin, a write buffer full pin, and a read buffer full pin.

In another embodiment, instead of using multiple auxiliary ports, one for each device, the auxiliary port can be a bus connected to each device with an appropriate select mechanism to identify the device that is using the auxiliary port.

The FIGS. 26–33 have been used to describe a specific aspect of the present invention, whereby one of ordinary skill in the art will appreciate that in an alternate embodiment, the bridge can consist of a single multi-device AGP channel for supporting three or more external AGP devices. In fact, where a bridge includes a single multi-device AGP channel, the bridge can act as an arbiter, whereby no address/data pins are needed by the bridge device 3410, thereby reducing pin count. However, when the bridge 3410 performs routing functions, for example as described herein, the signal transmitted on address/data pins will be used by the router portion 3416 to determine destination devices. Strictly speaking, since only one device is a master, and one device is a target at any time, the AGP protocol, from the perspective of each device connected to the bridge, is adhered to by this implementation. Furthermore, one of ordinary skill in the art will recognize that allowing for AGP channels capable of supporting multiple-devices is advantageous over the multiple channel solutions proposed herein because a fewer number of I/O pins are needed.

Generally, each of the multiple AGP devices described previously herein have been connected to separate AGP channels of a bridge. This is consistent with the AGP protocol which specifies a master/target point-to-point connection. Point to point means that active communication can only occur between two AGP devices that reside on an AGP interface, where one device is a target and the second device is a master. However, in accordance with another aspect of the disclosed invention, an AGP bridge that allows access by multiple AGP masters devices through a single channel is disclosed. This is illustrated in FIG. 34.

FIG. 34 illustrates a system 3400 including a bridge device 3410, and devices 3460 and 3470. Device 3460 has an AGP port which is connected to the bridge 3410 through nodes 3440. Device 3470 has an AGP port which is connected to the bridge 3410 through nodes 3450.

Bridge device 3410 includes a single device AGP channel 3412, a router 3416, and a multi-device AGP channel 3414. The router 3416 is connected to the single device AGP channel 3412 and to the multi-device AGP channel 3414.

In operation, the single device AGP channel 3412 controls bridge access to one of two devices in a point-to-point configuration. The multi-device AGP channel 3414 controls bridge access to multiple devices, such as graphics processors, over an AGP bus port that has been modified to be accessed by multiple processors.

The multi-device AGP channel 3414 includes a master control portion 3420, and device controls 3422 and 3423. In operation, the master control portion 3420 controls those AGP nodes that are connected to each of the multiple devices, and arbitrates control between individual device controls 3422 and 3423. The individual device controls 3422 and 3423 control AGP nodes that are uniquely connected to only one device.

In a specific embodiment, each device of the multiple devices controlled by the channel 3414 receives its own arbitration signals, which include side band address bus (SBA), request, grant, read buffer full, and write buffer full signals. These arbitration control signals are illustrated as bus portions 3432 and 3433 for devices 3460 and 3470 respectively.

By supporting a multi-device AGP channel, pin count of the bridge device can be reduced. For example, a typical AGP channel supports a set of primary nodes to provide point-to-point AGP accesses in accordance with the prior art. In accordance with the specific embodiment of the present invention, a multi-device channel uses the primary set of nodes plus an auxiliary set of nodes. As illustrated, the auxiliary set of nodes requires 12 additional pins from the channel 3414—eight SBA pins, a request pin, a grant pin, a write buffer full pin, and a read buffer full pin.

In another embodiment, instead of using multiple auxiliary ports, one for each device, the auxiliary port can be a bus connected to each device with an appropriate select mechanism to identify the device that is using the auxiliary port.

One of ordinary skill in the art, will recognize that in an alternate embodiment, the bridge can consist of a single multi-device AGP channel for supporting three or more external AGP devices. In fact, where a bridge includes a single multi-device AGP channel, the bridge can act as an arbiter, whereby no address/data pins are needed by the bridge device 3410, thereby reducing pin count. However, when the bridge 3410 performs routing functions, for example as described herein, the signal transmitted on address/data pins will be used by the router portion 3416 to determine destination devices. Strictly speaking, since only one device is a master, and one device is a target at any time, the AGP protocol, from the perspective of each device connected to the bridge, is adhered to by this implementation.

The FIG. 34 has been used to describe a specific aspect of the present invention, whereby one of ordinary skill in the art will appreciate that allowing for AGP channels capable of supporting multiple-device is advantageous over the multiple channel solutions proposed herein because a fewer number of I/O pins are needed.

FIG. 35 illustrates a system 3500 in accordance with another embodiment of the present invention. The system 3500 includes a bridge device 3510, a graphics processor 3561, a graphics processor 3562, a local memory 3552, and a local memory 3553.

The graphics processor 3561 has a first memory port connected to a memory port of the local memory 3552, a second memory port connected to a first memory port of the bridge device 3510, and a system bus port connected to a first system bus port 3521 of the bridge device 3510.

The graphics processor 3562 has a first memory port connected to a memory port of the local memory 3553, a second memory port connected to a first memory port of the bridge device 3510, and a system bus port 3527 connected to a second system bus port of the bridge device 3510.

In addition to the ports already defined, the bridge device has a third system bus port which can connect to a system level device, such as a host processor and/or a chip set associated with a host or system processor.

In accordance with a specific embodiment of the present invention, the system bus ports of the graphics processors 3561 and 3562 are connected to their respective graphics device ports by separate AGP bus connections.

In operation, graphics processor 3561 data accesses will be to either the local memory 3552 or to through the first memory port of the graphics device 3510 depending upon the type of data being accessed. For example, when multiple graphics processor are used to render a single screen image, it will be desirable for Z data and destination (DST) to be stored in a common memory accessed through the router 3520, so that it can be accessed by each of the multiple processors. Other types of data, such as texture data will generally be stored in local memories of the graphics processors.

The bridge device 3510 includes a router 3520, a route table, an arbiter 3548, a memory control 3540, a memory channel 3531, a memory channel 3532, and a memory 3551, which may be integrated into the device 3510, or accessed as a separate memory.

The memory channel 3531 has a first port connected to the first memory port of the bridge device 3510, and a second port connected to the arbiter 3548. The memory channel 3532 has a first port 3535 connected to the first memory port of the bridge device 3510, and a second port 3536 connected to the arbiter 3548. The arbiter 3548 is illustrated to interface to dual channel (CHA 3544 and CHB 3545) memory control 3540. In accordance with a specific embodiment of the present invention, the memory control 3540 supports dual ported memory accesses.

The router 3520 is illustrated in greater detail in FIG. 36, and includes a first system bus channel 3522, a second system bus channel 3523, a router engine 3621, and a third system bus channel 3524.

The first system bus channel 3522 has a first port 3521 connected to the first system bus port of the device 3510, a second port 3572 for accessing the memory 3540 (through the arbiter 3548), and a third port connected to the router engine (not shown in FIG. 35). Note that in a specific embodiment, the second port of the first system bus channel 3522 is optional, as will be discussed herein.

The second system bus channel 3523 has a first port connected to the second system bus port of the device 3510, a second port for accessing the memory 3540 (through the arbiter 3548), and a third port connected to the router engine (not shown in FIG. 35). Note that in a specific embodiment, the second port of the second system bus channel 3523 is optional, as will be discussed herein.

The third system bus channel 3524 has a first port connected to the third system bus port of the device 3510, and a second port connected to the router engine 3521.

In a specific embodiment of the present invention not having, or using the connections 3572 and 3554 between the router 3520 and the memory control 3540, the graphics processor 3561 initiates a fetch to retrieve specific graphics information from a host system. The fetch request is received at the first port of the channel 3522 of the router 3520. In response, the router will forward the request to the host connected to the third system port. Subsequently, the host will provide the data to the graphics processor 3561 through the first system port of the graphics device 3510. Upon receiving the fetched data, if it is Z data, as determined based upon the address, it will be stored using the second port of the graphics processor 3561 and sent to the first memory port of the bridge device 3510 for storage in the memory 3551. Upon receiving the fetched data, if it is Z data, as determined based upon the address, it will be stored using the first port of the graphics processor 3561 and stored in the local memory 3552.

In another embodiment of the present invention using the connections 3572 and 3554 between the router 3520 and the memory control 3540, the data can be routed directly to the memory control 3540 for storage in the memory 3551. In addition, the data can also be routed to the graphics processor 3561 at the same time it is being stored, so that the data can be rendered. In this embodiment, time and bandwidth is saved by not sending the data to the graphics processor 3561 before storing it back in the memory 3551.

Accesses to graphics data stored in the local memories 3552 and 3553 are made through the first memory ports of the graphics processors 3561 and 3562. Accesses to graphics data stored in the memory 3551 are made from the graphics processors 3561 and 3562 through the memory channels 3531 and 3532 respectively.

The FIG. 34 has been used to describe a specific aspect of the present invention, whereby one of ordinary skill in the art will appreciate that it is useful to provide a memory location accessible to each of a plurality of graphics processors that is accessible through a bridge device of the type illustrated in FIG. 35. Specifically, data, such as Z data and destination data, that is often associated with specific objects can be processed by a single processor, and the results be accessible to multiple processors, thereby reducing the amount of work done overall.

In general, a system and/or apparatus described herein may include additional system processing modules and memory. The processing module can be a single processing device or a plurality of processing devices. Such a processing device may be a custom or general purpose microprocessor, microcontroller, digital processor, microcomputer, a portion of a central processing unit, a state machine, logic circuitry, and/or any device that is capable of implementing the functions described herein.

Figure 25:
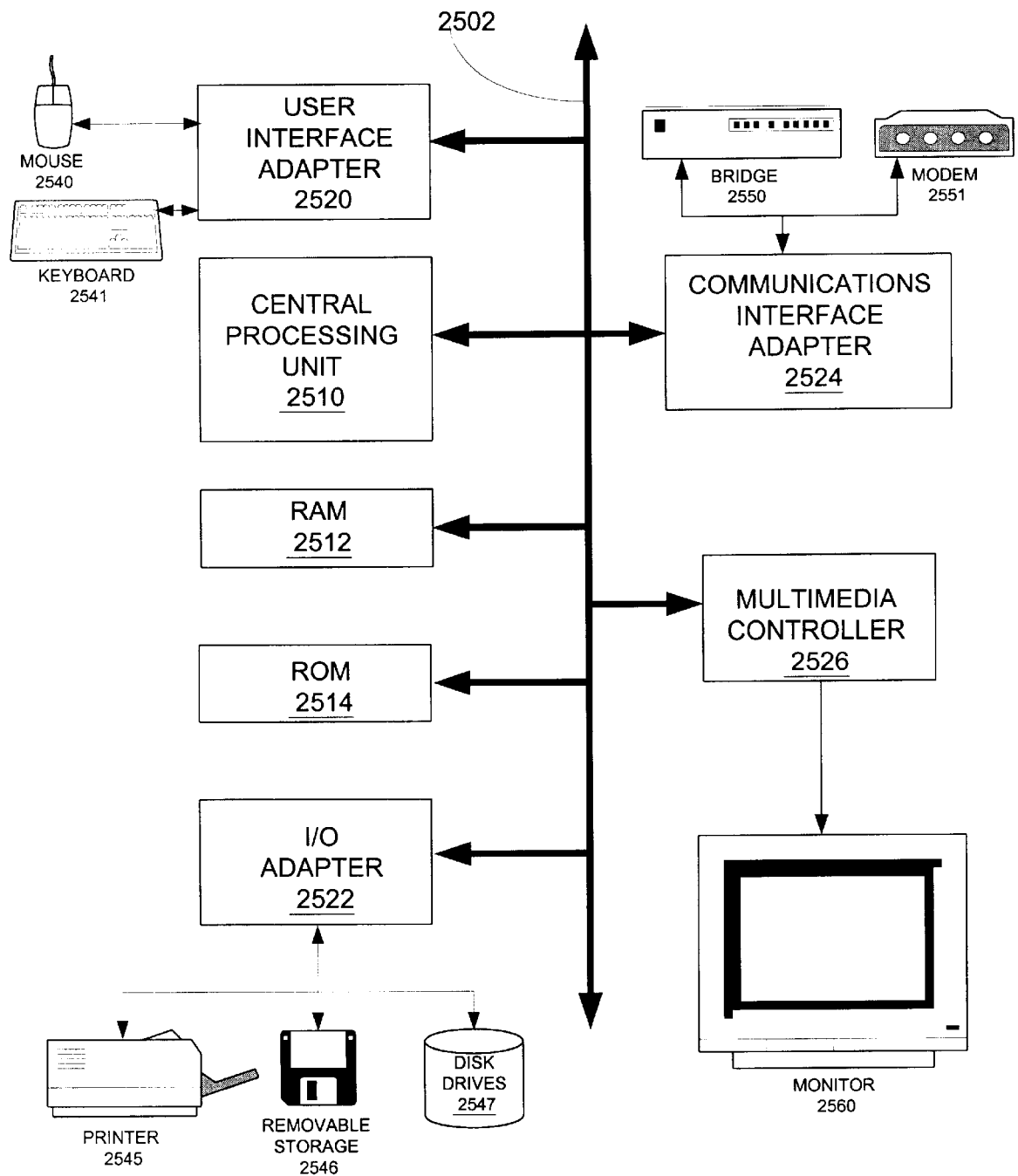
FIG. 25 illustrates, in block diagram form, a system containing the video graphics system of FIG. 1.

FIG. 25 illustrates, in block diagram form, a processing device in the form of a general purpose computer system 2500. The computer system 2500 is illustrated to include a central processing unit 2510, which may be a conventional proprietary data processor, memory including random access memory 2512, read only memory 2514, and input output adapter 2522, a user interface adapter 2520, a communications interface adapter 2524, and a multimedia controller 2526 coupled to a monitor 2560.

The input/output (I/O) adapter 2526 is further connected to, and controls, disk drives 2547, printer 2545, removable storage devices 2546, as well as other standard and proprietary I/O devices.

The user interface adapter 2520 can be considered to be a specialized I/O adapter. The adapter 2520 is illustrated to be connected to a mouse 2540, and a keyboard 2541. In addition, the user interface adapter 2520 may be connected to other devices capable of providing various types of user control, such as touch screen devices.

The communications interface adapter 2524 is connected to a bridge 2550 such as is associated with a local or a wide area network, and a modem 2551. By connecting the system bus 2502 to various communication devices, external access to information can be obtained.

The multimedia controller 2526 can include some or all of the various system portions illustrated herein.

Generally, the system 2500 will be capable of implementing the system and methods described herein.

We claim:

1. An apparatus for providing data to a plurality of graphics processors, the apparatus comprising:
    a first device bus interface having a first port to interface to a system bus port of first graphics processor, and a second port;
    a first memory interface having a first port to interface to a memory port of the first graphics processor, and a second port;
    a second device bus interface having a first port to interface to a system bus port of a second graphics processor, and a second port;
    a second memory interface having a first port to interface to a memory port of the second graphics processor;
    a memory having a first access port;
    a memory controller having:
        a first port coupled to the second port of the first memory interface;
        a second port coupled to the first access port of the memory; and
        a third port coupled to the second port of the second memory interface.

2. The apparatus of claim 1, wherein the memory is an embedded memory.

3. The apparatus of claim 2, wherein the memory has a width of greater than 128 bits.

4. The apparatus of claim 2, wherein the memory has a size of at least 8 megabytes.

5. The apparatus of claim 1, wherein the memory includes a cache.

6. The apparatus of claim 5, wherein the memory includes an external memory.

7. The apparatus of claim 6, wherein the external memory is a double data rate static random access memory.

8. The apparatus of claim 6, wherein:
    the memory further includes a second access port; and
    the memory controller includes a fourth port coupled to the second access port of the memory.

9. The method of claim 8, wherein a third device bus interface is to connect to an external system bus.

10. The method of claim 1, wherein the memory is to store Z graphics data and destination graphics data.

11. A method of accessing data in a system having a first graphics device, a second graphics device, and a processing device, the method comprising the steps of:
    providing inter-device access requests to a bridge device, where inter-device access requests are between at least two devices, wherein the at least two devices include the first graphics device, the second graphics device and the processing device, and the first graphics device includes a first local memory and the second graphics device includes a second local memory;
    for the first graphics device:
        accessing graphics data of a first type from the first local memory controlled by the first graphics device accessing the memory;
        accessing graphics data of the first type from the second local memory across the bridge device; and
        accessing graphics data of a second type from the bridge device.

12. The method of claim 11, wherein the graphics data of the first type is texture data.

13. The method of claim 12, wherein the graphics data of the second type includes Z data.

14. The method of claim 12, wherein the graphics data of the second type includes destination data.

15. The method of claim 14, wherein the graphics data of the second type includes Z data.

16. The method of claim 11, wherein the step of accessing graphics data of a second type from the bridge device includes accessing the graphics data from a bridge memory controlled by a graphics controller integrated into the bridge device.

17. The method of claim 16, wherein the bridge memory is integrated into the bridge device.

18. The method of claim 16, wherein the bridge memory is external the bridge device.

* * * * *